(12) United States Patent
Van Neer et al.

(10) Patent No.: US 11,402,405 B2
(45) Date of Patent: Aug. 2, 2022

(54) FREQUENCY TRACKING FOR SUBSURFACE ATOMIC FORCE MICROSCOPY

(71) Applicant: Nederlandse Organisatie voor toegepast-natuurwetenschappelijk onderzoek TNO, 's-Gravenhage (NL)

(72) Inventors: Paul Louis Maria Joseph Van Neer, Bergschenhoek (NL); Maarten Hubertus Van Es, Voorschoten (NL); Hamed Sadeghian Marnani, Nootdorp (NL); Rutger Meijer Timmerman Thijssen, San Jose, CA (US); Martinus Cornelius Johannes Maria Van Riel, 's-Gravenzande (NL)

(73) Assignee: Nederlandse Oganisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 0 days.

(21) Appl. No.: 17/287,825

(22) PCT Filed: Oct. 24, 2019

(86) PCT No.: PCT/NL2019/050701
§ 371 (c)(1),
(2) Date: Apr. 22, 2021

(87) PCT Pub. No.: WO2020/085907
PCT Pub. Date: Apr. 30, 2020

(65) Prior Publication Data
US 2021/0389345 A1 Dec. 16, 2021

(30) Foreign Application Priority Data
Oct. 25, 2018 (EP) .................. 18202543

(51) Int. Cl.
*G01Q 30/02* (2010.01)
*G01N 29/06* (2006.01)
(Continued)

(52) U.S. Cl.
CPC ......... *G01Q 30/02* (2013.01); *G01N 29/0618* (2013.01); *G01N 29/0681* (2013.01);
(Continued)

(58) Field of Classification Search
CPC .... G01Q 30/02; G01Q 60/24; G01N 29/0618; G01N 29/0681; G01N 29/12; G01N 2291/014
(Continued)

(56) References Cited

U.S. PATENT DOCUMENTS 5,319,977 A 6/1994 Quate et al.
8,322,220 B2 12/2012 Prater et al.
(Continued)

FOREIGN PATENT DOCUMENTS

DE 102005041301 A1 3/2007
WO WO 2010/085948 A1 8/2010

OTHER PUBLICATIONS

European Patent Office, International Search Report in corresponding International Application No. PCT/NL2019/050701, dated Mar. 10, 2020 (3 pages).

*Primary Examiner* — Nicole M Ippolito
(74) *Attorney, Agent, or Firm* — Leydig, Voit & Mayer, Ltd.

(57) ABSTRACT

A method and system for performing subsurface atomic force microscopy measurements, the system comprising: a signal source for generating an drive signal; a transducer configured to receive the drive signal for converting the drive signal into vibrational waves and coupling said vibrational waves into a stack comprising a sample for interaction
(Continued)

with subsurface features within said sample; cantilever tip for contacting the sample for measuring surface displacement resulting from the vibrational waves to determine subsurface features; wherein the system includes a measurement device for measuring a measurement signal returning from the transducer during and/or in between the subsurface atomic force microscopy measurements.

15 Claims, 14 Drawing Sheets

(51) Int. Cl.
    *G01N 29/12*     (2006.01)
    *G01Q 60/24*     (2010.01)

(52) U.S. Cl.
    CPC ............ *G01N 29/12* (2013.01); *G01Q 60/24* (2013.01); *G01N 2291/014* (2013.01)

(58) Field of Classification Search
    USPC .......................... 850/1, 2, 3, 4, 5, 6, 7, 8, 9
    See application file for complete search history.

(56) References Cited

U.S. PATENT DOCUMENTS

| | | | |
|---|---|---|---|
| 2008/0092659 A1 | 4/2008 | Flores et al. | |
| 2008/0295584 A1* | 12/2008 | Cantrell | G01Q 60/32 73/105 |
| 2011/0036170 A1* | 2/2011 | Shekhawat | G01N 29/0663 73/603 |
| 2020/0249255 A1* | 8/2020 | Van Es | G01Q 20/02 |

* cited by examiner

FREQUENCY TRACKING FOR SUBSURFACE ATOMIC FORCE MICROSCOPY

CROSS-REFERENCE TO RELATED APPLICATIONS

This patent application is a U.S. National Phase of PCT International Application No. PCT/NL2019/050701, filed Oct. 24, 2019, which claims priority to European Application No. 18202543.7, filed Oct. 25, 2018, which are both expressly incorporated by reference in their entireties, including any references contained therein.

FIELD OF THE INVENTION

The invention relates to a method and system for performing subsurface atomic force microscopy measurements. The invention further relates to methods and systems for subsurface imaging of nanostructures buried inside a three-dimensional (3D) substrate/sample such as a wafer, a chip, a mask and/or an integrated semiconductor device.

BACKGROUND TO THE INVENTION

In semiconductor applications, defect detection, metrology, alignment, overlay, etc. are challenging subjects. Atomic force microscopy (AFM), empowered by the use of ultrasound excitation can give information of the subsurface. For example, ultrasound can be delivered through the bottom of the sample (e.g. substrate) while the dynamic response of the AFM cantilever and tip in contact with the sample is monitored through the measurement of the contact resonance frequency or the measurement of the amplitude or phase change close to contact resonance. The ultrasound is typically delivered by means of an piezo transducer coupled into the sample.

It can be challenging to obtain sufficiently large out of plane motions of the sample for the successive subsurface AFM measurements carried out by means of an AFM cantilever tip being scanned across the surface of the sample. Certain parameters may result in a different excitation response of the sample for the successive AFM measurements. For instance, under certain circumstances, the sensed deflection by the cantilever tip may be significantly reduced thus affecting the AFM imaging. Particularly this may for instance be a result of changing clamping conditions, transducer-sample coupling conditions, temperature influences, etc.

Accordingly there remains a need for improving the quality, reliability and/or control over subsurface imaging of nanostructures buried below the substrate surface.

SUMMARY OF THE INVENTION

It is an object of the invention to provide for a method and a system that obviates at least one of the above mentioned drawbacks.

Additionally or alternatively, it is an object of the invention to improve control over the measurement parameters for subsurface atomic force microscopy measurements.

Additionally or alternatively, it is an object of the invention to improve the sample surface displacement, such that an improved measurable amplitude is obtained.

Additionally or alternatively, it is an object of the invention to make subsurface atomic force microscopy measurements less dependent on changing measurement conditions (e.g. clamping, coupling, temperature, etc.).

Thereto, the invention provides for an atomic force microscopy system for performing subsurface atomic force microscopy measurements, the system comprising: a signal source for generating a drive signal: a transducer configured to receive the drive signal for converting the drive signal into vibrational waves and coupling said vibrational waves into a stack comprising a sample (via delay line, coupling medium) for interaction with subsurface features within said sample; cantilever tip for contacting the sample for measuring surface displacement resulting from the vibrational waves to determine subsurface features; wherein the system includes a measurement device for measuring an measurement signal returning from the transducer during and/or in between tip measuring the surface displacement.

Various types of transducers can operate in two ways. On the one hand, the (two way) transducer can be used for actuation of the stack. On the other hand, it can also be used for measuring vibrations of the stack as a result of the vibrational actuation. For example, actuation may be out by means of an electro-magnetic transducer such as a piezo, which can convert and an electrical drive signal into vibrational/acoustic waves. Advantageously, the same transducer can be used to measure the resulting waves/vibration from the sample and convert this back into an electrical measurement signal e.g. indicative of vibrational resonances and/or standing waves in the stack. Also other types of transducers may allow such two-way operation, e.g. based on magnetostriction or pyroelectricity. The measurement of the vibrations of the stack can be done in a continuous manner and/or in a switched manner in which repeated actuation and sensing is carried out.

The dynamic vibrational behavior of the stack can be determined by means of the returning measurement signal captured by the electromagnetic transducer as a result of the vibrations of the stack. Under certain conditions, the dynamic behavior of the stack can change or shift in time when carrying out (successive) AFM measurements by scanning the cantilever tip across the surface of the sample. As a result of the change or shift of the dynamic behavior, the transfer function of the stack may change. In other words, the same input signal (e.g., voltage) for actuating the stack by means of the transducer does not provide the same measured output signal (e.g., voltage) associated with the measured vibrations detected by the transducer. This change of the dynamic behavior also occurs as a change in the frequency response function. Consequently, a drive signal may no longer be able cause the same (out-of-plane) deflection or vibratory movements of the stack that are required for performing the subsurface AFM measurements, as a result of the change in the dynamic behavior.

As mentioned, the transducer can be a two-way transducer enabling both actuation and sensing. The same transducer can be used in two-way for both actuating the stack by coupling vibrational waves into the stack and measuring the returning measurement signal.

Preferably, the transducer is an electro-mechanical transducer, e.g. a piezoelectric transducer that uses the piezoelectric effect for providing vibrational actuation and/or measuring vibrations of the structure to which it is coupled. Advantageously, a piezoelectric transducer can be used for both actuation and sensing. Various physical quantities can be measured using the piezoelectric transducer. The piezoelectric transducer may for instance generate electrical signals when exposed to vibrations.

The stack may further include a wave guide such as a delay line for guiding vibrational waves towards the sample. Additionally or alternatively, a coupling medium, such as a liquid may be provided between the transducer and the sample or between the wave guide and the sample. Changing conditions of the coupling between the transducer and the sample may result in a different dynamic vibrational behavior of the stack.

If small scale subsurface features within the sample are larger than a wavelength of the vibrational waves propagating through the sample, then a wave interference can be obtained indicating the presence of said subsurface feature. The indication of the subsurface features can be determined by means of the cantilever tip. Typically, the employed vibrational waves have a wavelength substantially equal or smaller than the size of the expected features within the sample. Refraction can occur at the corners of the features, which can cause interference.

Typically the transducer is actuated by the electric drive signal using electrodes attached to the transducer, e.g. at either sides of a piezo. It will be appreciated the same electrodes can also be used for measuring the measurement signal resulting from mechanical vibrations in the transducers from earlier coupled waves, e.g. standing waves.

Optionally, the system includes a controller configured to adjust the drive signal based on the measurement signal.

Advantageously, by measuring the measurement signal returning from the transducer during and/or in between the subsurface atomic force microscopy measurements, the drive signal can be adjusted and/or tuned to obtain a desired movement of the sample. A vibrational movement or deflection of the surface of the sample, on which the AFM cantilever tip performs subsurface AFM measurements, can for instance be maintained. The drive signal can thus be changed accurately taking into account the changing dynamic behavior of the sample.

Optionally, the controller is configured to determine at least one resonance peak (e.g. frequency) of the stack based on the measurement signal. The controller may be configured to determine at least one acoustic/elastic resonance peak of the stack. It will be clear that the (acoustic) resonances of the stack with the sample are typically very different from the (vibrational) resonances of the contacting AFM cantilever.

The dynamic amplitude of the vibrational movement of the sample depends on the frequency components within the electric drive signal provided to the transducer. A larger dynamic amplitude can be obtained by including frequency components in the electric drive signal at and/or near a resonance peak of the stack.

The resonance peaks of the stack can change or shift as a result of changing measurement conditions. For instance, a changing clamping or coupling between the transducer and the sample may result in a shift of the resonance peaks in the frequency response function of the stack. The coupling conditions can change for example as a result of a change in a coupling medium (e.g. a liquid such as water) between the transducer and the sample.

An initial frequency response function of the stack can be determined or estimated, for example by means of a calibration measurement and/or by means of a simulation. It is also possible to use other computational models, for example analytical models, empirical models, finite element models or a combination of such models. On the basis of the frequency response function, a certain peak can be selected where it will be acted upon. As a result, the supplied drive signal will have a frequency component which is selected at or at least in the vicinity of the resonance frequency peak. This can be a higher order mode (e.g. 180th mode) of the vibration modes of the stack.

Optionally, the controller is configured to determine a change (or shift) of at least one resonance frequency of the stack during the subsurface atomic force microscopy measurements.

A gradual change in the coupling conditions between the transducer and the sample may result in a gradual change difference in the dynamic vibrational response of the stack. A change of the at least one resonance frequency of the stack can be used for controlling or maintaining dynamic vibrational deflections of the surface of the sample during the subsurface AFM measurements by means of the cantilever tip.

Optionally, the controller is configured to adjust the drive signal based on the change of the at least one resonance frequency of the stack for tracking and/or following the at least resonance frequency of the stack.

An identification of a change of the at least one resonance frequency of the stack can be used for adjusting the drive signal in order to maintain a desired surface displacement of the sample. Since the stack is excited by means of the transducer with a drive signal comprising a frequency component close to the selected resonance peak, movements of the surface of the sample can be obtained which are sufficiently large for performing the subsurface AFM measurements across the surface.

Optionally, the transducer is configured to simultaneously excite the stack and measure the returning signal. Interference patterns between an input signal and an output signal may be used.

Optionally, the system includes a circulator, wherein a first port of the circulator is connected to the transducer, a second port of the circulator is connected to the measurement device and a third port of the circulator is connected to the signal source. For example, the circulator is configured to pass signals from the signal source to the transducer, and from the transducer to the measurement device.

The circulator may enable measurement on-the-fly. A circulator may operate without switching. Actuation (cf. send) and measurement (cf. receive) can be separated by means of the circulator in different ports, such that actuation and sensing can be performed continuously and rapidly.

Optionally, wherein the system includes a switch arranged for switching between actuation, in which the drive signal is provided to the transducer, and sensing, in which the measurement signal is received by the measurement device, wherein during the atomic force microscopy measurements the switch is repeatedly switched between actuation and sensing.

During the subsurface AFM measurements wherein the cantilever tip is scanned across a surface of the sample, the electric drive signal can be adjusted based on the returning measurement signal indicating a change in the relevant resonance peak used for said subsurface AFM measurements.

Optionally, wherein the measurement device is configured to measure at least one of a voltage of the measurement signal, a current of the measurement signal, or an impedance of the transducer.

Optionally, wherein the signal source is configured to perform a multi-frequency excitation including a plurality of frequency components, wherein the drive signal includes a first set of frequency components for performing the subsurface atomic force microscopy measurements.

Optionally, the measurement device is configured to measure a frequency response of at least one of the frequency components of the first set of frequency components.

Optionally, the drive signal includes a second set of frequency components including one or more frequency components, wherein the one or more frequency components are different than the frequency components of the first set, and wherein the measurement device is configured to additionally measure a frequency response at at least the frequencies of the second set of frequency components.

An active read-out can be performed using the measurement device. A signal can be generated for tracking (resonance) peaks. The measurement signal returning from the transducer can be continuously read-out. Hence, the modulated signal for subsurface AFM can be further modified for performing electrical measurements using the measurement device. Next to the frequency components required for the subsurface AFM downmixing step, a range of distinct extra frequency components can be emitted so as to measure a shift of a resonance peak. In this way, detection of large shifts can be enabled. The resonance peak can be tracked even when the resonance peak is deformed.

The frequency difference of the extra frequency components can be chosen such that after downmixing they do not overlap with downmixed frequency components needed for subsurface AFM. Additionally or alternatively, the amplitude of the extra frequency components may be chosen such that they are usable for pulse-echo measurements, while being negligible compared to desired downmixed frequency components needed for subsurface AFM.

Optionally, the drive signal includes at least a carrier frequency component and a modulation frequency component. Due to the non-linear tip sample interaction, the cantilever is driven at frequencies given by linear combinations of these drive signal components. In particular these drive signal components may be chosen such that the difference between a carrier frequency component and a modulation frequency component is equal to or near to a cantilever contact resonance frequency, during the subsurface atomic force microscopy measurements, wherein the controller is configured to adjust the carrier frequency of the drive signal based on the measurement signal. To be effective, the modulation frequency in the driving signal is preferably selected at or near the contact resonance frequency of the cantilever.

The electro-magnetic transducer may be a linear transducer (e.g. piezoelectric) producing an acoustic wave on the two frequency components $f(c)-f(m)$ and $f(c)+f(m)$ (for two frequency mixing). The tip-sample interaction may result in a non-linearities behaving as a quadratic mixer. A Fast Fourier Transform (FFT) of the time domain electric drive signal provided to the transducer would result in two peaks in the frequency domain, namely at $f(c)-f(m)$ and $f(c)+f(m)$.

The frequency response function of the stack actuated by means of the transducer, a plurality of peaks and valleys are included. The peaks can correspond to resonance frequencies of the stack. It is desired to detect if the actuation of the stack is performed at or near a resonance peak. In this way, larger sample surface deflections may be obtained resulting in more reliable subsurface AFM measurements. First, a resonance peak may be identified and/or detected. Next, variations occurring in the frequency response may be monitored. These variations may result in a shift of the identified resonance peak. The electrical input drive signal may be adjusted depending on these variations such as to at least take into account a shift in one or more peaks. A frequency shift of an identified resonance peak can be used to adjust the electrical input drive signal in order to optimize the sample surface displacement (e.g. maximization). For example, this can be performed by optimizing the carrier frequency $f(c)$.

In an example, the resonance peak can be determined and monitored and successively an adjusted carrier frequency $f(c)$ can be used in the electrical input drive signal to enable actuation of the stack exactly at the resonance frequency.

The tip-sample interaction may act as a non-linear mixer. For example, the tip-sample interaction can result in second order mixing, such that the difference between peaks and lows can be even larger (squared). Actuation at or near the resonance peak may thus be of great importance for obtaining reliable subsurface AFM imaging measurements.

Optionally, wherein the controller is configured to adjust the carrier frequency based on the change of the at least one resonance frequency in order to track and/or follow the at least one resonance frequency, wherein the carrier frequency is maintained at the at least one resonance frequency being tracked and/or followed such that the difference frequency component and the sum frequency component are located on opposite sides of the carrier frequency.

A very high ratio between the carrier frequency (GHz) continuous wave and the modulation frequency (MHz) continuous wave can lead to standing waves in the stack, which may include the transducer, optional wave guide, optional coupling medium and the sample. A small change in thickness, plan parallellity or mechanical properties of layers (silicon, sample, coupling layer) can lead to large shifts in the resonance peaks and therefore in the transducer-clamp to sample surface displacement transfer function. Due to the large period of the modulation (large wavelengths) signal, limited by cantilever dynamics, standing wave resonances occur in the stack. As the fundamental mode of these standing resonances typically occur in the MHz range, small changes in the geometry/material properties of the stack lead to large variations in the frequency locations of the resonance peaks at GHz frequencies and therefore in large variations in the piezo-clamps to sample surface displacement transfer function.

Advantageously, the location of one or more resonance peaks of interest can be detected and tracked during a subsurface AFM scan over an x, y grid. This information can be used to maximize the sample surface displacement by optimization of the carrier frequency with respect to the frequency of the maximum of the tracked resonance peak. The resonance peak can be tracked with minimal/without interference with the subsurface AFM measurements and as such minimizing the effect of the tracking on the total system throughput.

Interleaved AFM measurements with short/limited frequency sweeps on the measurement device (e.g. vector impedance meter) can be carried out. The sweeps can be performed during the time the AFM tip is moving from one (x, y) sample surface location to the next location. It will be appreciated that initially, at the start of the subsurface AFM measurements, a carrier frequency sweep and modulation frequency sweep can be performed in order to determine optimal frequencies.

A passive read-out can be performed using the measurement device. The measurement device may be arranged to perform a continuous read-out of the measurement signal returning from the electro-magnetic transducer using the signal employed for the subsurface AFM (GHz). Hence, the modulated signal required for subsurface AFM may not require further modification for performing the measurements.

Optionally, the controller is configured to use for tracking and/or following the at least one resonance frequency at least one of: a ratio of frequency response amplitudes of two different frequency components; a frequency response amplitude of at least one frequency component; or a time-derivative of a frequency response amplitude of at least one frequency component.

Optionally, the controller is configured to use the ratio of the frequency response at the difference frequency component and the frequency response at the sum frequency component for tracking and/or following the at least one resonance frequency.

Optionally, the controller is configured to use the amplitude of at least one of the difference frequency component or the sum frequency component for tracking and/or following the at least one resonance frequency.

Optionally, the controller is configured to use the time-derivative of the amplitude of at least one of the difference frequency component or the sum frequency component for tracking and/or following the at least one resonance frequency.

Optionally, the second set of frequency components have a different frequency than the modulation frequency or an integer number of times the modulation frequency.

Optionally, amplitudes of the second set of frequency components are smaller than amplitudes of the first set of frequency components. In this way, detrimental influencing of the subsurface AFM measurements can be avoided.

Optionally, a layer of a coupling medium is provided between the transducer and the sample in the stack, wherein the controller is configured to determine a measure of the thickness of the layer of coupling medium based on the change of the at least one resonance frequency of the stack during atomic force microscopy measurements.

Optionally, the controller is configured to control a supply of coupling medium in order maintain a substantially constant thickness of the layer of coupling medium.

Often, the dimensions of the sample and the dimensions of the electro-magnetic transducer are well known. The uncertainty may be particularly concentrated in the coupling medium layer (e.g. water layer between the transducer and the sample, or the waveguide and the sample). The temperatures are also often known (e.g. measured), so it is known whether there are major changes or not. The frequency shift can be somewhat linked to the change in the thickness of the coupling medium. Hence, the stability of the measurement system may highly depend on the coupling medium layer thickness. The thickness of the coupling medium layer can decrease due to evaporation (e.g. liquid water). If the liquid coupling medium partially evaporates, the frequency response of the stack can significantly change. A feedback loop may be arranged with a supply for the coupling medium in order to control the thickness of the coupling medium.

Optionally, the transducer is an electro-mechanical transducer, such as a piezo-electric transducer, the electro-mechanical transducer being configured to receive an electrical drive signal for converting the electrical drive signal in the vibrational waves being coupled into the stack, wherein the measurement device is an electrical measurement device for measuring an electrical measurement signal returning from the transducer.

Optionally, the stack is excited by means of the transducer at a first side, wherein the AFM cantilever is employed at a second side of the stack, opposite the first side. For instance, the transducer can be used for employing bottom actuation of the stack, with the cantilever measuring a top portion of the stack. For instance, when the stack is actuated from the bottom side, the AFM measurements may be more sensitive (e.g. for temperature variations, small movements or vibrations), requiring carrier frequency tracking according to the invention.

It will be appreciated that it is also possible that the transducer is employed for actuating the stack at a same side at which the cantilever is used for performing AFM measurements.

According to an aspect, the invention relates to a method for performing subsurface atomic force microscopy measurements, including the steps of: providing a signal source for generating a drive signal; providing an transducer configured to receive the drive signal for converting the drive signal into vibrational waves and coupling said vibrational waves into a stack comprising a sample (via delay line, coupling medium) for interaction with subsurface features (order of c/fc wavelength, with c being the wave speed) within said sample; providing a cantilever tip for contacting the sample for measuring surface displacement resulting from the vibrational waves to determine subsurface features; wherein a measurement device is provided for measuring an measurement signal returning from the transducer during and/or in between the subsurface atomic force microscopy measurements.

Carrier frequency tracking for subsurface scanning probe microscopy can be performed. For subsurface scanning probe microscopy (SPM), the carrier frequency may be tuned with respect to a resonance of the stack, such as to ensure that a signal reaches the SPM, and thus subsurface measurement can be performed. In this way, subsurface measurements can be obtained having an improved signal to noise ratio, while the system is allowed to change due to for instance external influences (e.g. reducing thickness of the coupling medium in the stack, changing temperatures, etc.). Tracking the resonance peak and tuning the input signal to the transducer can enable a higher resolution of subsurface characterization, even during possible changing conditions while performing a subsurface AFM scan across a surface of a sample.

The electro-mechanical transducer may be a piezo-electric transducer. A piezo-electric transducer may simplify the mechanical coupling of vibrational waves into the stack. It will be appreciated that other types of transducers may also be employed, such as for example a magneto-striction, pyroelectric, or other types of transducers.

It will be appreciated that any of the aspects, features and options described in view of the method apply equally to the system. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
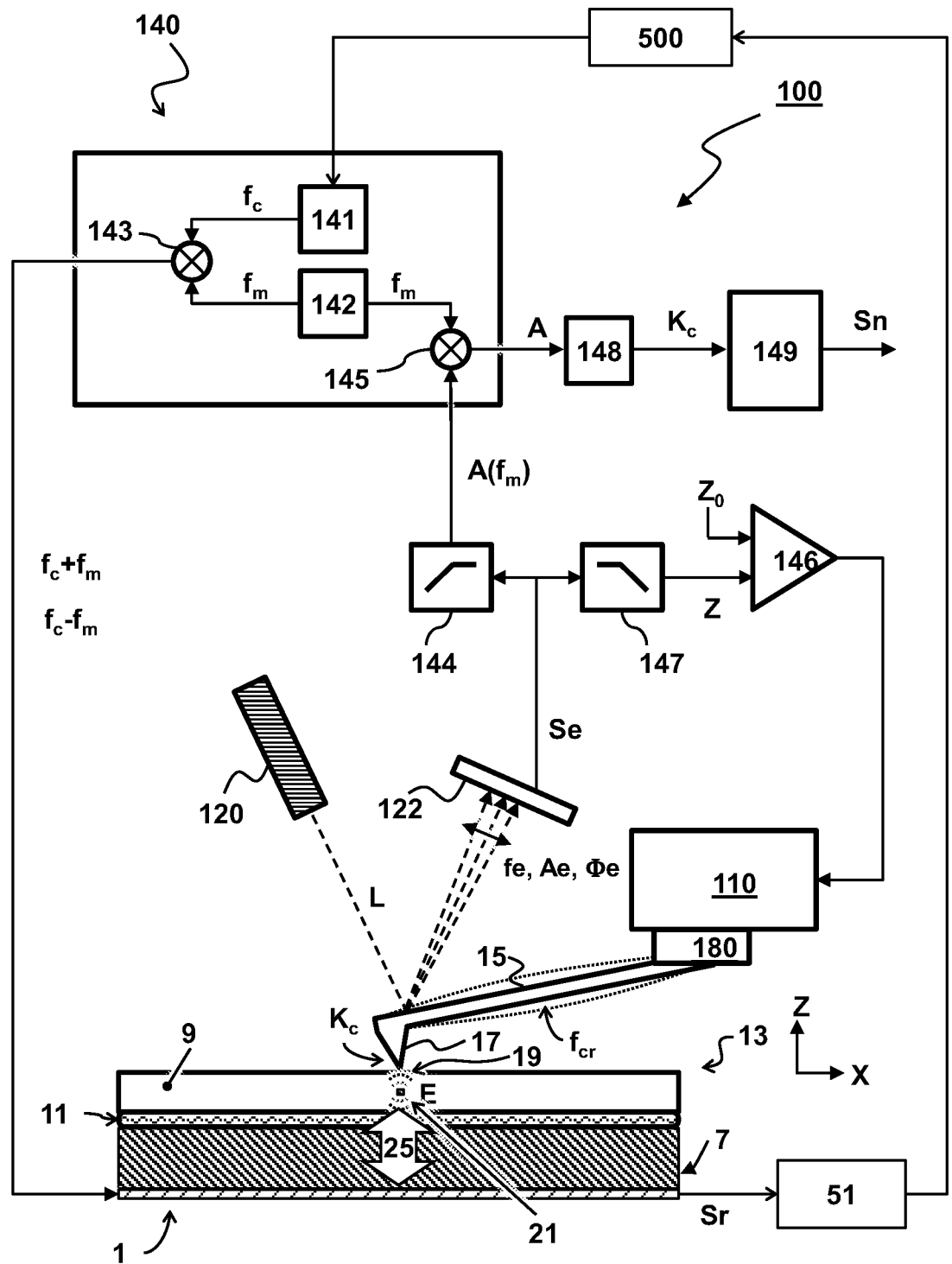
FIG. 1 shows a schematic diagram of a subsurface AFM system.

FIG. 1 shows a schematic diagram of a subsurface AFM system 100. The atomic force microscopy system 100 is configured for performing subsurface atomic force microscopy measurements. The system 100 comprises: a signal source for generating an drive signal 5; an transducer 1 configured to receive the drive signal 5 for converting the drive signal 5 into vibrational waves 25 and coupling the vibrational waves 25 into a stack 13 comprising a sample 9 for interaction with subsurface features 21 within said sample 9; a cantilever tip 17 for contacting the sample 9 for measuring the surface displacement resulting from the vibrational waves 25 to determine the subsurface features 21. Furthermore, the system 100 includes a measurement device 51 for measuring an measurement signal "Sr" returning from the transducer 1 during and/or in between the tip 17 measuring the surface 19 displacement.

In some embodiments, the transducer 1 is an ultrasound generator configured to generate standing ultrasound waves 25 directed to the sample 9. The sample 9 can be a substrate. The transducer 1 is connected to a wave guide 7. The wave guide 7 is connected to the substrate 9 with a coupling medium 11 therebetween. The sample is plate shaped with the nanostructures 21 to be imaged. The system 100 comprises an AFM tip 17 configured to scan a top surface 19 of the substrate 9. The system 100 may further include a substrate holder configured for holding the stack. The AFM tip 17 and/or substrate holder may be configured for relative movement to scan the substrate 9.

The ultrasonic electro-magnetic transducer 1 (e.g. piezoelectric transducer) can be configured to couple generated ultrasound waves 25 via a bottom face of the substrate 9 into an interior of the substrate 9. An optional waveguide 7 for propagating the ultrasound waves 25 along a thickness of the substrate 9 transverse to the bottom face of the substrate 9 (vertical direction).

The system 100 can comprise a sensor system configured to image the nanostructures 21 by using the AFM tip 17 and/or cantilever 15 to measure an effect "E" at the top surface 19 caused by direct or indirect interaction of the ultrasound waves 25 with the buried nanostructures 21. In the shown embodiment of the AFM, a probe is attached to a scan head 110. The scan head 110 enables scanning of the probe relative to a top surface 19 of substrate 9. The probe consists of a cantilever 15 and a probe tip 17. During scanning, the probe tip 17 is brought in contact with the top surface 19 of the substrate 9. For example the probe tip 17 may be scanned across the surface of the substrate 9 in contact mode (continuous contact between the probe tip 17 and the surface of the substrate 9) or tapping mode (periodic contact between the probe tip 17 and the surface of the substrate 9 during each cycle of a vibration applied to the cantilever 15).

The AFM can be configured to measure subsurface nanostructures 21 below the top surface 19. In an example, the AFM tip 17 is brought in contact with an area under investigation. In another or further example, a subsurface parameter Sn is calculated based on measurement of a contact stiffness Kc of the atomic force microscope AFM at the exposure area. Typically, ultrasound waves 25 in the substrate 9 may be coupled via the AFM tip 17 to the AFM cantilever 15 causing vibration of the AFM cantilever 15. For example, a vibrational amplitude "Ae" of the AFM cantilever 15 may depend on a contact stiffness Kc of the AFM tip 17 contacting the substrate 9. Contact stiffness Kc may be quantified e.g. as the combined stiffness of the tip contacting the substrate, e.g. derivate of a force experienced by the tip as a function of displacement of the tip. It will be appreciated that the contact stiffness Kc may depend on material properties of the nanostructures (17) below the substrate surface 19. In turn, the contact stiffness may determine vibrational modes in the AFM cantilever 15.

In some examples, a contact resonance frequency "fcr" of the AFM cantilever 15 may depend on the contact stiffness Kc. Accordingly, a contact resonance frequency "fcr" of the AFM cantilever 15 while the AFM tip 17 contacts the substrate 9 can be a measure for the effect "E" of the interaction between the ultrasound waves 25 with the nanostructures 21 below the top surface 19 of the substrate 9. The contact resonance frequency "fcr" may be probed e.g. by including a modulation frequency "fm" in the ultrasound waves 25 through the substrate 9. Alternatively, or in addition, ultrasound waves 25 may be generated at the tip (not shown), or both at the tip and the sample simultaneously (not shown). For example, the ultrasound waves 25 can be modulated by a modulation frequency "fm" near a contact resonance frequency "fcr" of the AFM. The closer the modulation frequency "fm" is to the contact resonance frequency "fcr", the higher the amplitude "A" of the resulting vibration in the AFM cantilever 15 at that frequency. Accordingly, in some embodiments, the imaging of subsurface nanostructures 21 may be based on a measurement of a vibrational amplitude "Ae" of the AFM cantilever 15. Also other parameters such as the frequency "fe" and/or phase of the cantilever vibration can be used as measure for the nanostructures 21.

In addition to the modulation frequency "fm", the ultrasound waves 25 may comprise other signal components, e.g. a carrier frequency "fc". For example, the carrier frequency "fc" can be a relatively high frequency determining scattering interaction with the nanostructures 21 while the modulation frequency "fm" is at a relatively low frequency near a contact resonance frequency of the cantilever. For example, the carrier frequency "fe" is between 100 MHz and 100 GHz. For example, the modulation frequency "fm" is lower than the carrier frequency "fe", e.g. by a factor of at least ten, e.g. between 9 kHz and 9 MHz. It will be appreciated that also other frequencies, e.g. for heterodyne detection, can be envisaged depending on the particulars of the system under investigation and/or intrinsic properties of the cantilever.

Ultrasonic force microscopy may for example be performed by applying an ultrasonic signal to a bottom face of the substrate 9 and modulating the ultrasonic wave with a modulation frequency "fm" of approximately the cantilever resonance frequency. By sensing the output signal at the modulation frequency and analyzing the amplitude and/or phase, subsurface structures can be imaged. Without being bound by theory, this may be explained by the fact that the high frequency (fc) ultrasonic signal may be perturbed by the subsurface structures. Information on the subsurface structures is conveyed via these perturbations and becomes measurable in the deflection of the probe tip, i.e. the output sensor signal at or near the cantilever resonance frequency.

In the shown example, a signal generation and analysis system 40 is used to generate and extract signals. A first signal generator 41 provides a first signal at the carrier frequency "fc". A second signal generator 42 provides a second signal at the modulation frequency "fm". The frequencies may serve as input for a mixer 43 which generates mixed signals e.g. providing three frequency components: the carrier frequency fc, the carrier frequency fc lowered by the modulation frequency "fm" to obtain a frequency component fc−fm, and the carrier frequency fc increased by the modulation frequency "fm" to obtain a frequency component fc+fm. For example, offering these frequency component signals in a favorable signal component ratio may yields an amplitude modulated wave having a frequency "fc" wherein the amplitude modulates at a frequency "fm".

In the shown example of FIG. 1, a single electro-magnetic transducer 1 (transducer) is shown to generate ultrasound waves 25 at a particular set of frequencies. Alternatively, or in addition, multiple ultrasonic generators (not shown) can be used in homodyne or heterodyne configuration. For example an additional frequency may be applied directly to the AFM probe, e.g. by a modulated laser beam L or otherwise. Furthermore, signals may be generated at alternative or additional frequencies than shown or only at a single (modulation) frequency. In some embodiments, the signals may be amplified in a power amplifier (not shown) before being provided to the transducer 1. In the shown example, a coupling medium 11 (e.g. water, wax, oil, etc.) is used to provide for acoustic coupling between the generator 1 and the substrate 9. In alternative embodiments this may be omitted.

In the shown example, the laser 120 sends a light beam "L" at a position on the AFM cantilever 15. Vibrational movement of the AFM cantilever 15 causes deflection of the reflected beam which is measure by sensor 122 which is sensitive to the position of the impinging beam, e.g. a quadrant detector. The sensor 122 results in a measurement signal Se.

In one process path, high frequency components of the signal Se can be extracted by a high pass filter 144 to the analysis system 140. In particular, the passed signal comprises a frequency component with a certain amplitude "A" at the modulation frequency "fm". The amplitude "A" may be retrieved e.g. by a demodulator 145 using the original modulation frequency "fm" as reference. For example, the demodulator 145 may comprise a lock-in amplifier. The amplitude "A" may be processed by a processor 148 to calculate the contact stiffness Kc. The contact stiffness may be used by processor 149 to calculate subsurface parameter Sn for imaging the nanostructures 21. It will be appreciated that the processors 148 and 149 may also be integrated. Alternatively, or in addition, the step of calculating the contact stiffness Kc may omitted and the subsurface parameter Sn directly calculated from the vibrational amplitude "Ae" or any other measured characteristics such as fe and Φe. Alternatively, or in addition, the contact stiffness Kc may be directly equated to the subsurface parameter Sn.

In another process path, low frequency components of the signal Se are extracted by a low pass filter 147 as a measure of a distance or height "Z" between the AFM tip 17 over the substrate surface 19. The measured distance may be fed into a comparator 146 together with a desired distance (also called "Z0"), e.g. corresponding to a desired average force/deflection of the probe. The output signal of the comparator may be used to control a height of the scan head 110 to which the probe is attached.

While the present embodiment shows ultrasound waves being applied to the substrate 9, ultrasound AFM can be additionally done via the tip 17, e.g. by optional transducer 180.

Accordingly, various embodiments can be envisaged such as heterodyne force microscopy, atomic force acoustic microscopy, waveguide ultrasonic force microscopy, force modulation microscopy. Preferably, the electro-magnetic transducer 1 contacts a face of the substrate 9 directly, or indirectly via a coupling medium 11 and/or a wave guide 7. The generator preferably comprises an electro-acoustic transducer, e.g. based on piezo transducers, electrostatic actuation etc. In some embodiments, additional ultrasound in the AFM cantilever 15 can be generated in various ways such as using piezo transducers, electrostatic actuation, photo thermal actuation via the light beam "L", etc.

In the shown example, a laser source 120 provides a laser beam L that impinges on the cantilever 15 and reflects towards an optical detector 122. Using the optical detector 122, vibrations in the cantilever 15 can be sensed due to small deflections of the reflected beam L under influence of such vibrations. This provides an output signal Se for further analysis, e.g. by a processor to calculate an image of subsurface nanostructures 21. In some embodiments, the processor may comprise a memory to store previous measurements or reference values for comparison.

Alternative or in addition to measuring beam deflection also other ways may be envisaged for measuring the cantilever deflection and/or vibration frequency/amplitude. Alternative sensing techniques for example include the application of a piezo-resistive layer, the electrical resistance of which vary with probe deflection. Probe deflection may in that case be detected by detecting voltage differences in an electric signal applied to the piezo-resistive layer. As another alternative, probe deflection may be detected using a piezo-electric element or layer, the potential of which changes dependent on cantilever motion. Alternatively, capacitive measurements may be applied in an electrostatic sensing technique. As some further alternatives, one may also apply an interferometer to measure probe deflection or perform a heat flux measurement in a thermal method by using a temperature difference between probe and substrate. The skilled person will be familiar with such techniques and is able to apply them in embodiments of the present disclosure.

The system 100 further includes a controller 500 configured to adjust the drive signal based on the measurement signal. The controller can be configured to determine at least one resonance peak of the stack based on the measurement signal obtained by means of the measuring device 51 electrically connected to the transducer 1. The controller 500 can be configured to determine a change of at least one resonance frequency of the stack during the subsurface atomic force microscopy measurements.

The controller 500 may be configured to perform carrier frequency tracking, wherein the carrier frequency is tuned with respect to a resonance of the stack, such as to improve the AFM measurement characterization under changing conditions influencing the frequency response. Hence, in this way an improved signal to noise ratio can be obtained, while the system is allowed to change due to for instance external influences.

Figure 2:
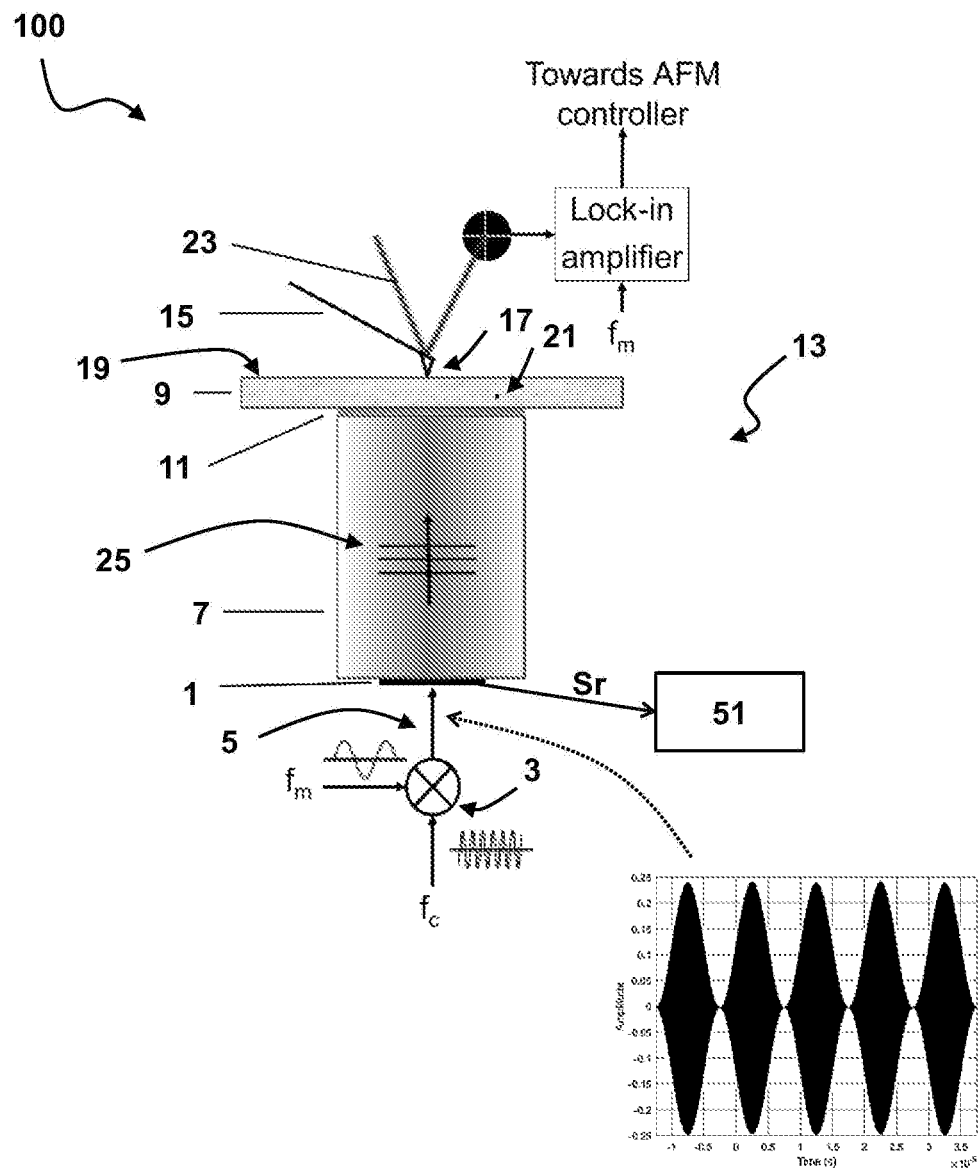
FIG. 2 shows a schematic diagram of a subsurface AFM system.

FIG. 2 shows a schematic diagram of a subsurface AFM system 100. A combination of two frequencies, namely a carrier frequency f(c) and a modulation frequency f(m) is provided to the electro-magnetic transducer 1. For this purpose, two signals having different frequencies f(c), f(m) can be mixed. It may also be possible to directly generate such a mixed signal, for instance using a signal generator. The carrier frequency f(c) has a higher frequency than the modulation frequency f(m). The carrier frequency f(c) signal and modulation frequency f(m) signal can be combined in the mixer 3 (which may be an implicit feature, e.g. carried out in a controller) in order to obtain the resulting electric drive signal for actuation of the electro-magnetic transducer. Optionally, an amplifier is used for amplifying the resulting electric drive signal 5. In some embodiments, a piezoelectric electro-magnetic transducer 1 is used. It will be appreciated that other types of transducers may also be employed. The piezoelectric transducer 1 is coupled to a wave guide 7 (e.g. delay line). The wave guide 7 is further connected to the sample 9 with a coupling medium 11 (e.g. thin layer of liquid, such as water) therebetween. The piezoelectric transducer 1 may further be clamped on a base member (not shown). The transducer 1, waveguide 7, coupling medium 11 and the sample 9 may form a stack 13. An AFM cantilever 15 is arranged for performing subsurface AFM measurements. The cantilever tip 17 of the AFM cantilever 15 is scanned across the surface 17 of the sample 9 in order to map subsurface features 21 buried within the sample 9. The cantilever tip 17 can pick up the frequencies induced by the transducer 1, resulting in a vibrational movement of the cantilever tip 17 which can be detected by means of a laser beam 23.

The carrier frequency f(c) may be in the range of GHz and the modulation frequency may be in the range of MHz. In an example, the carrier frequency is in the range of 0.5-50 GHz, and the modulation frequency smaller than 5 MHz. It will be appreciated that other ranges are also possible. The modulation frequency f(m) may depend on the used AFM cantilever. The modulation frequency may for instance be smaller than 1 to 2 MHz, depending on the cantilever contact resonance frequency. However, higher frequencies may also be possible depending on the AFM set-up.

Both elasticity (cf. stiffness) and scattering contrast can be present in the obtained subsurface AFM imaging picked up by the AFM cantilever tip. The contrast may mainly come from GHz signals, and the modulation may depend on the contact resonance frequency of the cantilever 15. By employing a carrier frequency f(c) having higher frequencies (GHz-range), the scattering contrast may become relatively more important than the stiffness contrast in the subsurface AFM imaging. Therefore, typically GHz frequencies are employed for the carrier frequency f(c). It will be appreciated that, depending on the application, other frequency ranges may also be used for performing the subsurface AFM measurements.

The modulation frequency f(m) may be chosen based on the contact resonance frequency of the AFM cantilever. For instance, the modulation frequency f(m) may be equal to the contact resonance frequency of the AFM cantilever. However, other subsurface AFM measurement techniques may also be employed. For instance, the modulation frequency f(m) may be chosen to be different than the contact resonance frequency of the AFM cantilever 15. Additionally or alternatively, it is possible to use different cantilever modes. Typically, the resonance behavior of the cantilever is exploited for obtaining an increased surface displacement which can be beneficial for the subsurface AFM measurements.

The subsurface features buried in the sample can be determined using the vibrational waves 25 generated by means of the transducer 1. The vibrational waves 25 may be acoustic waves having relatively high frequencies in the GHz range in order to obtain scattering information for subsurface characterization of the sample. These high frequencies (GHz) may be difficult to directly detect (mechanically) by means of the AFM cantilever. However, the carrier frequency signal f(c) (GHz range) can be modulated with a frequency at which the cantilever 15 is able to extract the scattering information from the sample 9.

The cantilever tip 17 can act as a non-linear mixer. At the tip-sample contact, i.e. the contact area between the cantilever tip 17 and the surface 19 of the sample 9, the modulated GHz frequency vibration (including carrier frequency and modulation frequency) can be downmixed to the modulation frequency f(m) which can be picked up by the cantilever tip (cantilever can vibrate at this frequency). Downmixing enables acquiring information on higher frequencies (GHz) in lower frequencies (MHz) which can be measured by means of mechanical means, i.e. the AFM cantilever.

Based on the known dynamic mechanical behavior of the cantilever 15, a contact resonance frequency of the cantilever 15 can be excited during the subsurface AFM measurements for increasing the dynamic tip deflection of the cantilever tip 17.

It will be appreciated that the wave guide 7 can be an optional feature of the stack 13. Similarly, the coupling medium can be optionally employed in the stack. It may also be possible that the waveguide 7 is integrated with the electro-magnetic transducer 1. Hence, a wave guide 7 or delay line may be employed for practical reasons depending on the set-up or application. The wave guide 7 may be arranged in the stack 13. Typically, the piezoelectric transducer 1 has small geometric dimensions when it is used for generating the GHz vibrations directed to the stack 13. For instance, the piezoelectric transducer 1 may be a thin patch having a thickness of about 1 micrometer. Such a structure may be fragile and difficult to clamp. The piezoelectric transducer 1 may be connected or coupled to a wave guide 7. The wave guide 7 may for instance be a patch of silicon making clamping of the stack 13 more easy for performing the subsurface AFM measurements. Typically, silicon has low acoustic losses, such that it can act as a one-dimensional (1D) waveguide, in which the waves can be guided towards the sample 9. By means of the wave guide 7, the waves 25 may retain a same initial shape. The waves may be delayed (cf. delay line) without substantially influencing the subsurface AFM characterization.

Figure 3:
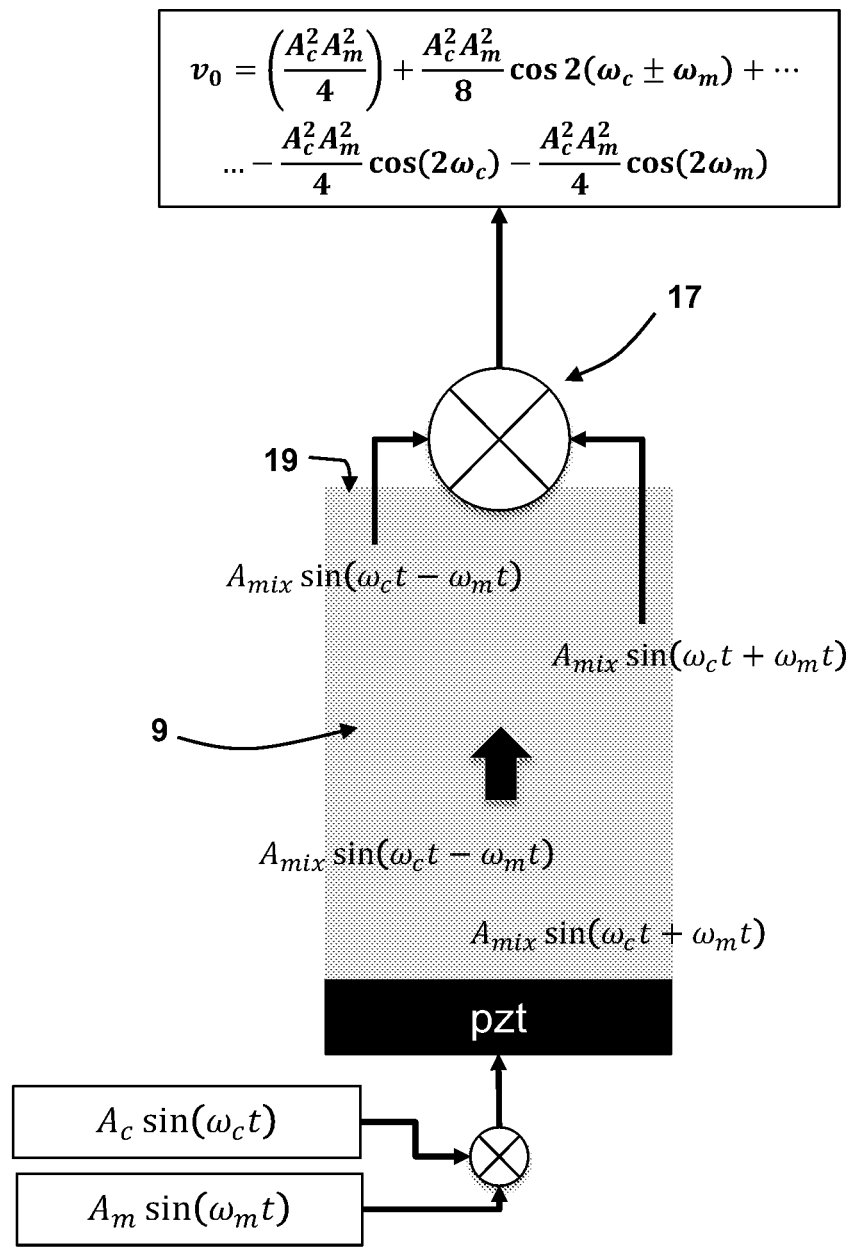
FIG. 3 shows a schematic diagram of two frequency mixing.

FIG. 3 shows a schematic diagram of two frequency mixing. A carrier and a modulation frequency are generated. The two harmonics are mixed and the transducer 1 can direct the sum and differences of these frequencies towards the sample 9. The sum and difference can travel through the sample with a given amplitude. As a result of the tip-sample interaction during contact, the cantilever tip 17 can mix the signal (second order shown) an generate new frequencies, namely a DC component, a $2f(m)$ component a $2f(c)$ component, a $2f(c)+2f(m)$ component and a $2f(c)-2f(m)$ component. This is valid for the employed two frequency mixing. However, other frequency mixing techniques may also be employed, such as for example a three frequency mixing.

A Hertzian contact may be obtained when the cantilever tip (e.g. having a spherical shape) is pressed against the surface of the sample. The shown formula is valid for a quadratic mixer, indicating how the input signals are mixed obtaining the resulting frequency components.

The drive signal may include two frequency components, namely a difference frequency component f(c)−f(m), and a sum frequency component f(c)+f(m), wherein f(c) is the carrier frequency and f(m) is the modulation frequency. The drive signal 5 can be an input signal provided to the transducer 1. Optionally, an amplifier is used for amplifying the input signal 5. As a result of the tip-sample contact, there a component at $2f(m)$ may be obtained, which can be picked up properly if the cantilever resonance is on (or near) this frequency. The frequency component at $2f(m)$ may be picked up by means of the mechanical motion of the cantilever (e.g. in MHz range). In this way, subsurface features within the sample can be determined using the cantilever deflection.

Next to two-frequency mixing in which f(c)−f(m) and f(c)+f(m) is employed in the input drive signal to the transducer, also other techniques may be used. For instance, a three-frequency mixing may be used, wherein f(c)−f (m) and f(c)+f(m) and f(c) are included in the input drive signal to be provided to the transducer 1. As a result of the tip-sample contact during the subsurface AFM measurements, the induced vibrational waves can be downmixed such that a frequency component is obtained at f(m) and at $2f(m)$ which can be detected by the cantilever 15 as a result of mechanical vibrations of the cantilever tip 17.

Hence, by using a combination of a carrier frequency f(c) (e.g. GHz range) and a modulation frequency f(m) (e.g. MHz range), downmixing can be obtained enabling identification of subsurface features by means of dynamic motion of the cantilever tip 17. The piezoelectric transducer 1 may generate an acoustic wave (in the GHz range) which is directed through the wave guide and the sample, generating a surface sample movement. Downmixing can be considered as going from a GHz vibration (which is difficult to measure by means of mechanical motion of a cantilever) to a MHz vibration measurable by means of the cantilever tip 17, wherein the MHz vibration includes contrast information regarding the subsurface features within the sample (amplitude variation and phase variation). The MHz vibration of the contact resonance contains contrast (amplitude/phase) present in the GHz vibration.

Figure 4A:
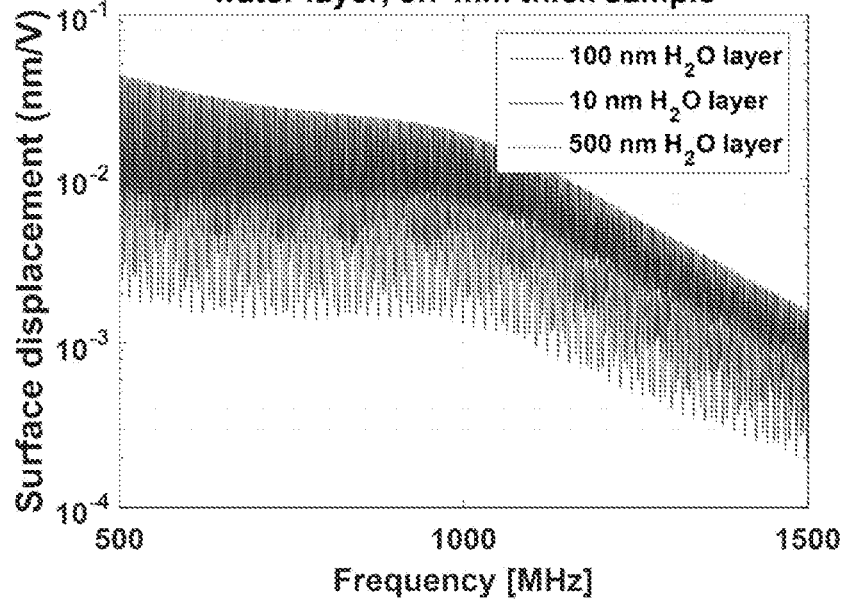
FIG. 4 shows transfer functions of a stack.

FIG. 4 shows transfer functions of the stack vibrationally actuated using an electro-magnetic transducer 1. The illustrated transfer functions are obtained for a stack including the transducer 1, a wave guide 7, a coupling medium 11 and a sample 9. The transducer may be a piezoelectric transducer, the wave guide may be a silicon delay line and the coupling medium may be a liquid water layer for example.

Figure 4B:
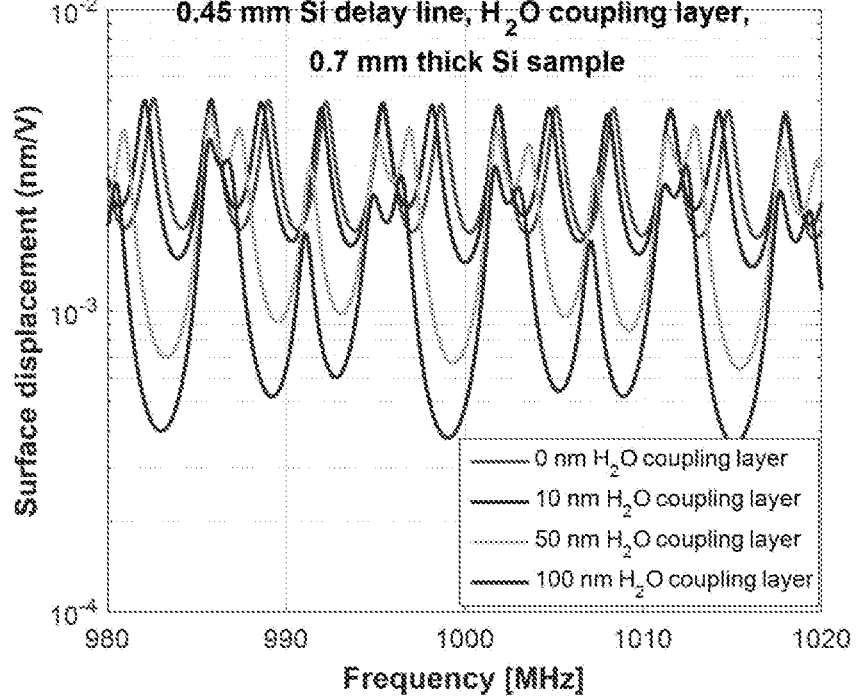

The stack 13 may be vibrated by means of continuous waves generated by the transducer 1. The generated waves may experience constructive and destructive within the stack 13, resulting in peaks and lows in the surface displacement versus frequency graph shown in FIG. 4A and FIG. 4B. A higher sample surface displacement can be obtained by selecting frequency components near or at a resonance frequency peak. Such higher sample surface 19 displacement may be desired for reading a signal properly by means of the cantilever tip 17 during the subsurface AFM measurements. FIG. 4B shows a zoom of a band around 1 GHz. As can be seen, the transfer function is shifted when the thickness of the coupling medium layer 11 (e.g. water coupling medium layer) changes. Such a change of the thickness of the coupling medium layer 11 may for instance occur during the subsurface AFM measurements.

Figure 5A:
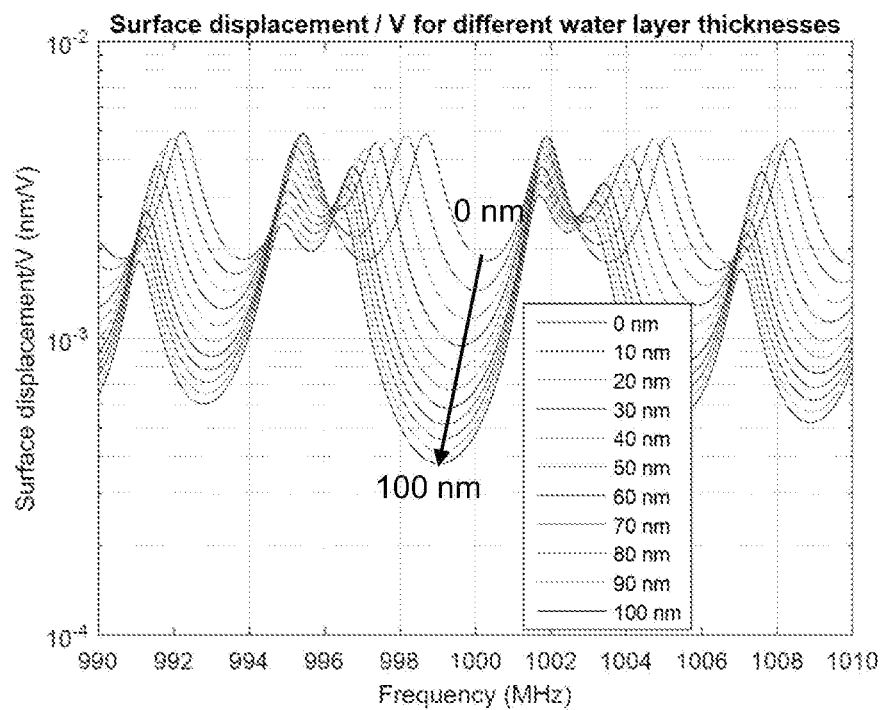
FIG. 5 shows transfer functions of a stack and a graph of a thickness of the coupling medium versus the frequency.
Figure 5B:
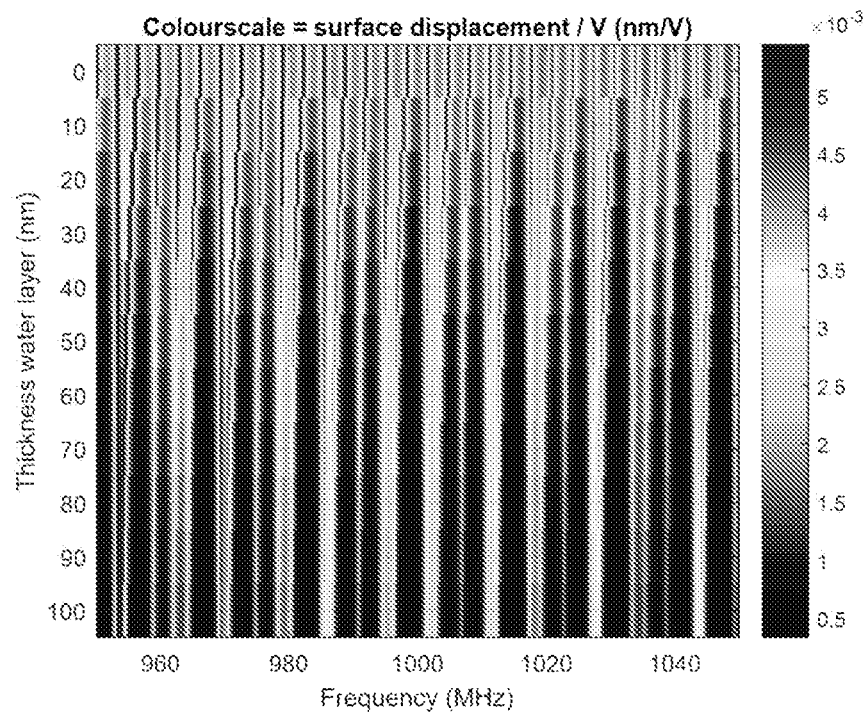

FIG. 5 shows transfer functions of a stack (FIG. 5A) and a graph of a thickness of the coupling medium versus the frequency (FIG. 5B). The thickness of the coupling medium may significantly influence the dynamic vibrational behavior of the stack 13. By controlling the thickness of the coupling medium layer the shift of the resonance frequencies in the frequency response function can be substantially limited and/or prevented. The coupling medium may for instance be a thin layer of a liquid such as water, for example around 5-150 nanometer. Other suitable materials may also be used as the coupling medium.

It may be desired to keep the variation in the thickness of the coupling medium as small as possible. For every coupling medium layer thickness, there exist peaks and lows which may be located at a different frequency. The frequency response function may gradually shift in frequency in function of the layer thickness. By actuating the stack at a peak (resonance), an improved signal can be measured by means of the cantilever tip performing the subsurface AFM measurements on the sample surface. As can be seen in FIG. 5B, for certain resonance peaks, a 20 nm variation in water layer thickness can give approximately a factor two change in the sample surface displacement.

The coupling medium layer thickness may be monitored in order to keep it substantially stable or constant, for example using a feedback control loop. On the other hand, the thickness of the coupling medium layer may be allowed to vary, wherein the disadvantages of this varying thickness is limited by means of tracking of the frequency peak (resonance).

It will be appreciated that other conditions may also result in shifting of the frequency response of the stack, such as for example temperature changes inducing a variation in the speed of sound (e.g. speed of sound of silicon samples depends on the temperature), contamination, clamping variation, etc. The carrier frequency may be varied in order to track a peak or resonance enabling more reliable subsurface AFM measurements. Additionally or alternatively, other adjustment techniques may also be employed for tracking a resonance peak in order to obtain sufficiently large sample surface displacements for the subsurface AFM measurements. In an example, temperatures are adjusted for tracking a resonance peak.

FIG. 6 shows a schematic diagram of signal source 50, transducer 1 and measurement device 51 set-ups. The transducer 1 in the AFM system 100 can be used for both actuation and sensing. A measurement device 51 may be coupled to the transducer for measuring the returning measured signal.

The measurement device 51 may for instance be a vector impedance meter. A vector impedance meter may be configured to apply a voltage across a resistor (cf. impedance) and simultaneously measures the current and voltage. In this way, the electrical impedance can be determined. The vector impedance meter may be used together with a piezoelectric transducer. The electrical impedance of piezoelectric materials can be used for obtaining information regarding the mechanical frequency response of the material. The resonances in the mechanical domain are also present in the measured (returning) electrical signals, i.e. also observable in the electrical domain.

It may be possible to measure the impedance of the piezoelectric transducer while the AFM tip moves from one sample to another. Advantageously, in this way, interference with the AFM measurement can be reduced or prevented. Additionally or alternatively, it may be possible to alternatingly perform actuation and sensing using the electro-magnetic transducer. Additionally or alternatively, a second electro-magnetic transducer may be arranged for performing sensing, while a first electro-magnetic transducer is employed for performing the actuation of the stack. Additionally or alternatively, it is possible that sensing by means of the measuring device is performed at the same time (simultaneously) while performing actuation for the subsurface AFM measurements (instead of switching). Since vector impedance meters typically use very low voltage to measure, interference may be limited enabling continuous actuation and sensing.

Figure 6A:
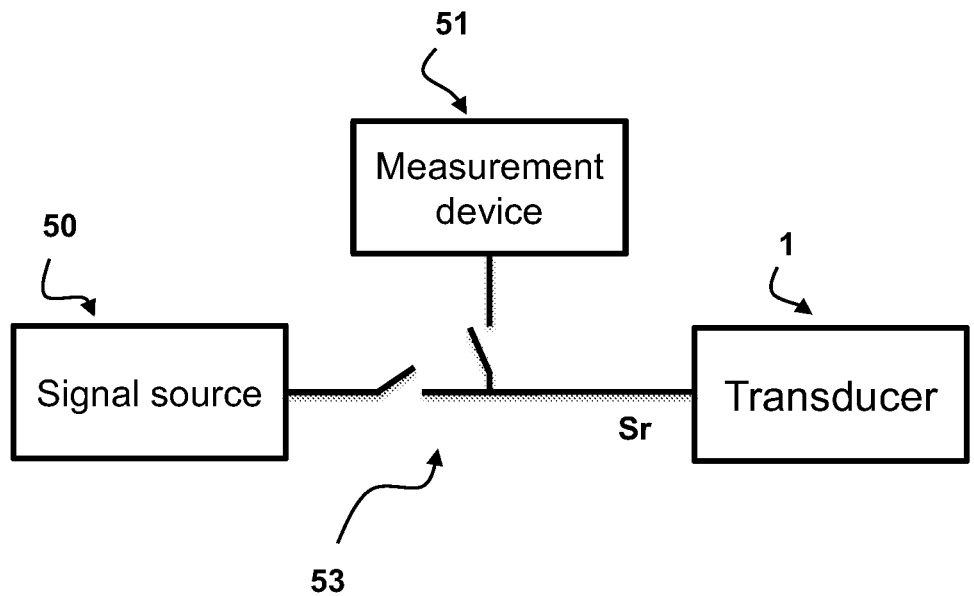
FIG. 6 shows a schematic diagram of signal source, transducer and measurement device set-ups.

In the example of FIG. 6A, the system 100 includes a switch 53 arranged for switching between actuation, in which the drive signal is provided to the transducer 1, and sensing, in which the measurement signal is received by the measurement device 51, wherein during the AFM measurements the switch is alternatingly switched between actuation and sensing.

Figure 6B:
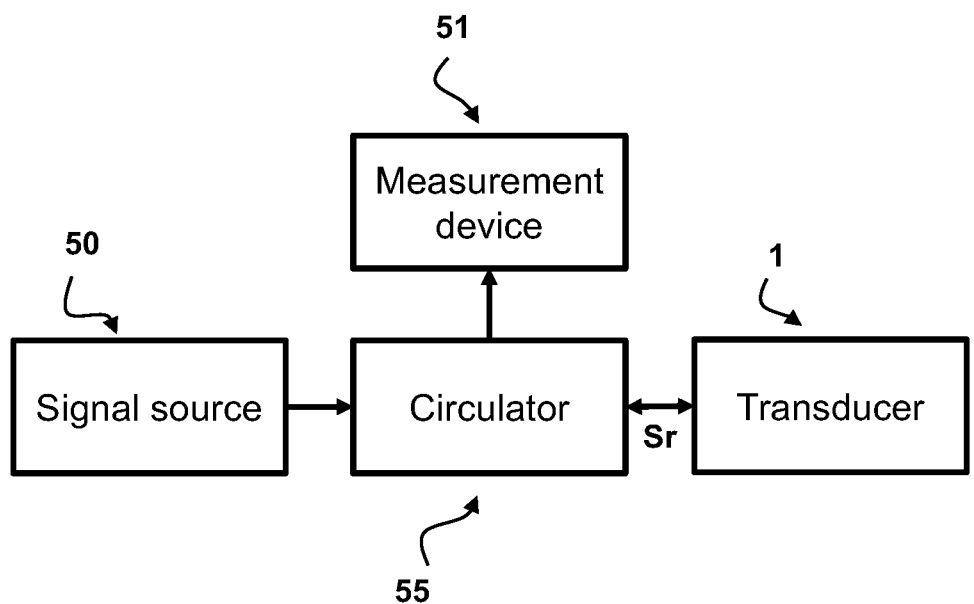

In the example of FIG. 6B, a circulator 55 is arranged between the measurement device 51 and the transducer 1, and between the signal source 50 and the transducer 1. The circulator 55 may be configured to connect the signal source 50, transducer 1 and the measurement device 51 (e.g. oscilloscope). The circulator can be an electrical device configured to ensure that the signal source 50 is linked to the electro-magnetic transducer 1 but not directly to measurement device 51, and that the returning measurement signal from the electro-magnetic transducer 1 is linked to the measurement device 51 but not to the signal source 50. In this way, damage to the measurement device 51 may be avoided for example.

In an example, a voltage can be measured. However, other electrical quantities, such as current and impedance may also be measured. It may be possible to measure a magnitude and/or a phase of the electrical quantities. The impedance may be determined from the voltage and current. Typically, performing measurements of a voltage with GHz frequencies may be easier compared to performing measurements of a current with GHz frequencies.

Figure 7A:
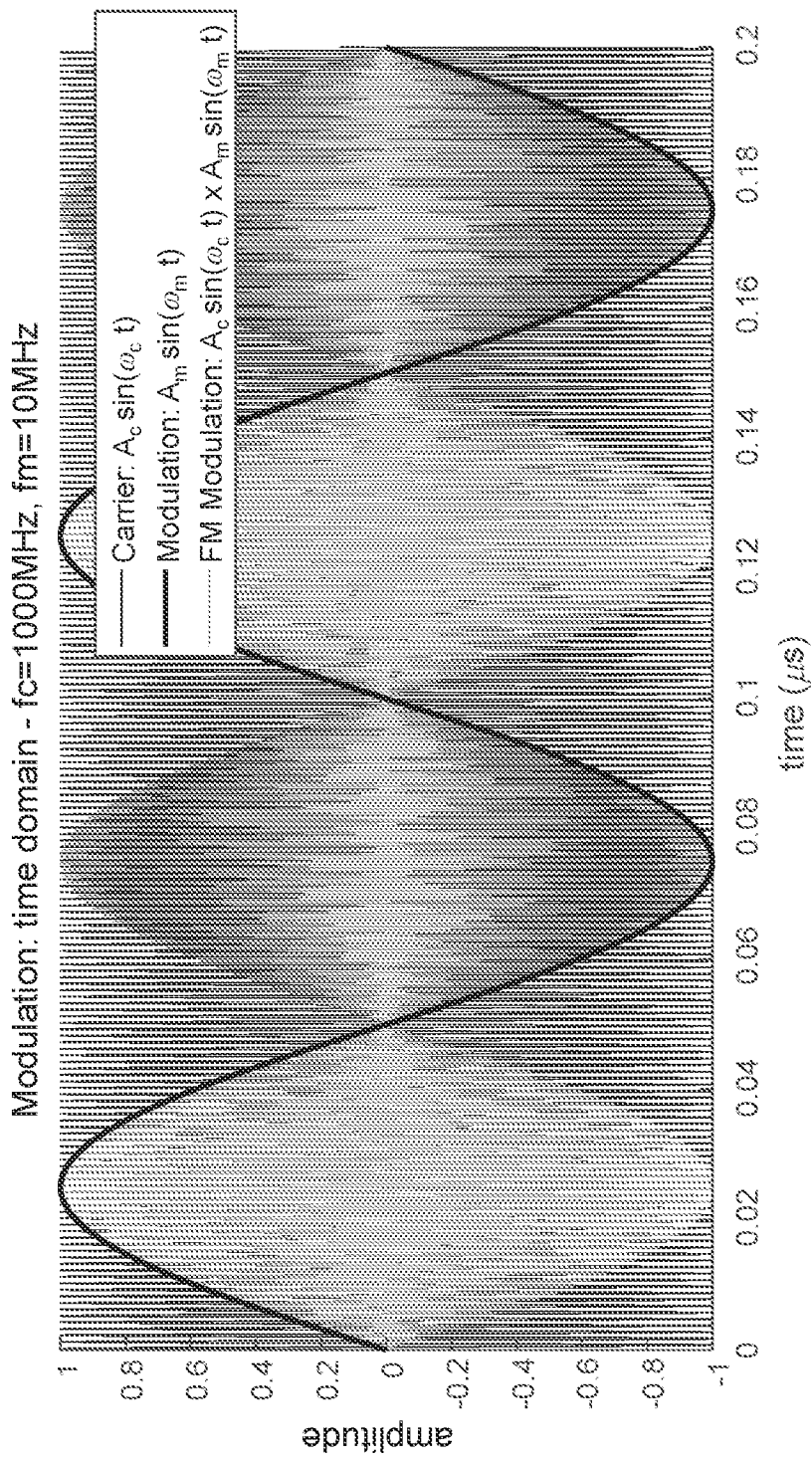
FIG. 7 shows a drive signal in time and frequency domain.
Figure 7B:
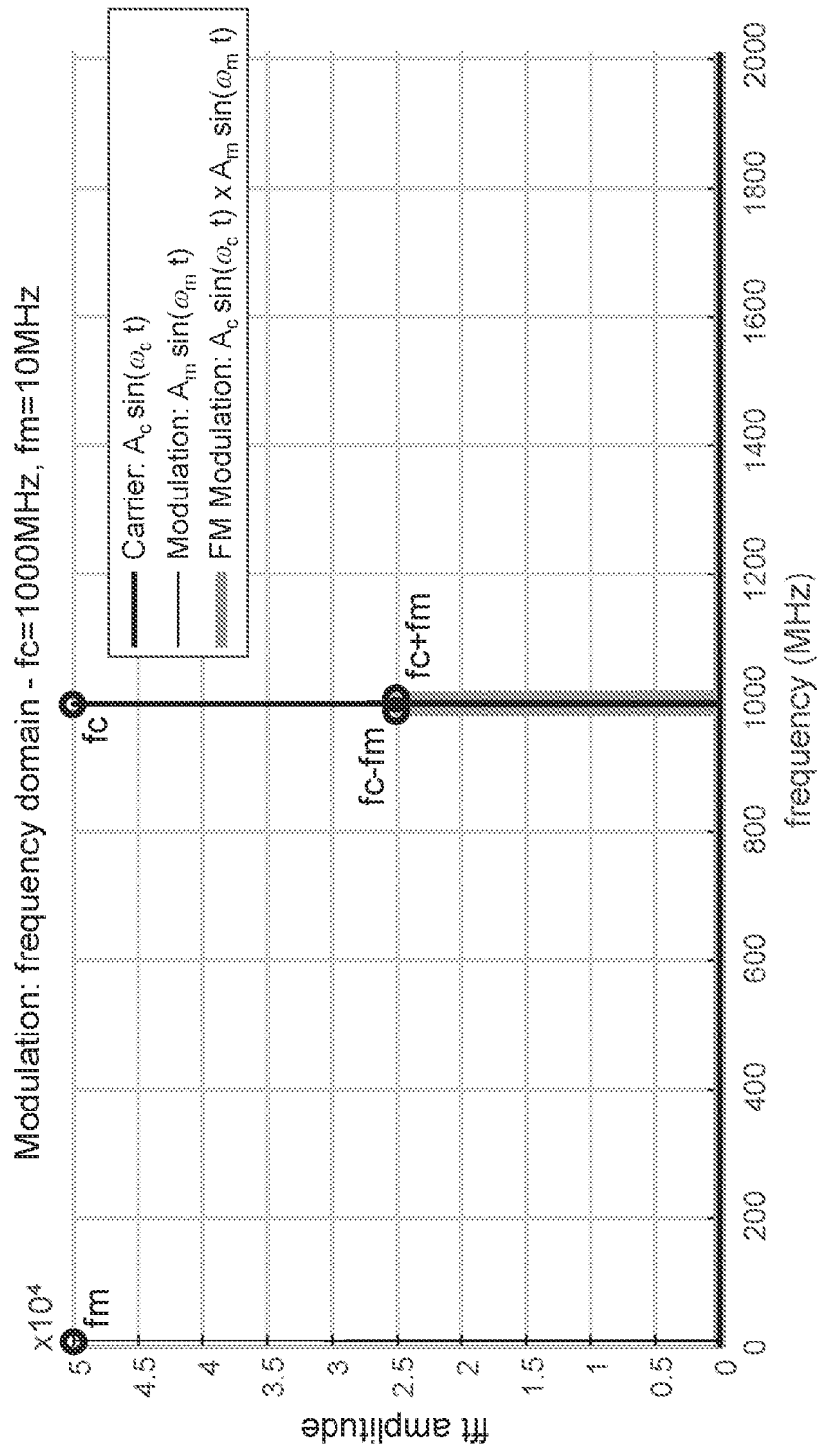

FIG. 7 shows an drive signal in time and frequency domain. FIG. 7A shows a resulting time domain signal obtained after downmixing (at the cantilever tip). The modulation frequency f(m) is the signal produced linearly by the piezo and travelling through the sample (and optionally through the delay line). The carrier and modulation time traces are shown. The amplitude of the carrier frequency component is one and the amplitude of the modulation frequency component is also one. The product of the carrier frequency component and the modulation frequency component is shown as a frequency modulation. FIG. 7B shows the same drive signal in frequency domain. The spectral lines of the sum and difference have the same amplitude.

Figure 8A:
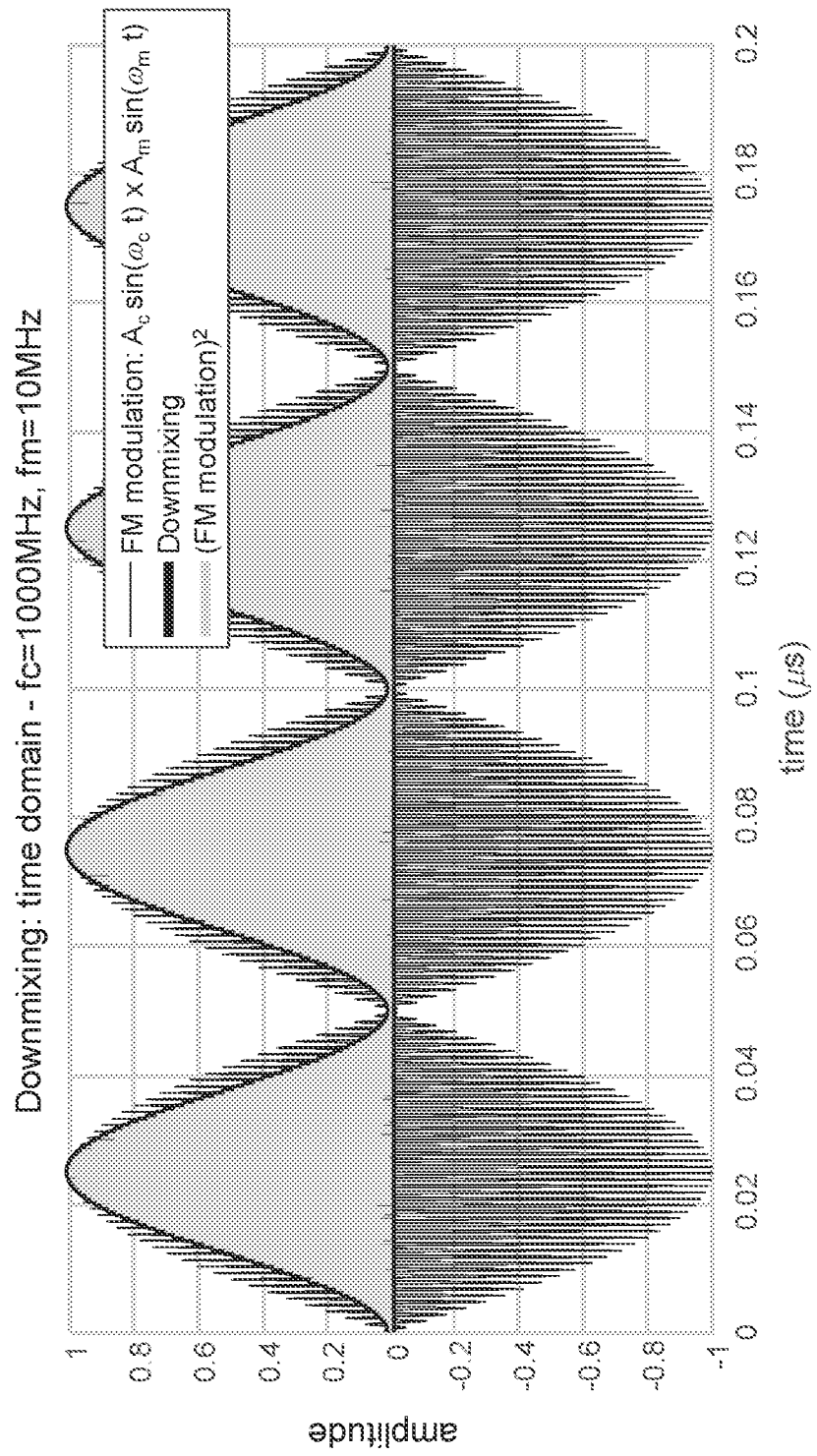
FIG. 8 shows a two-frequency downmixing.
Figure 8B:
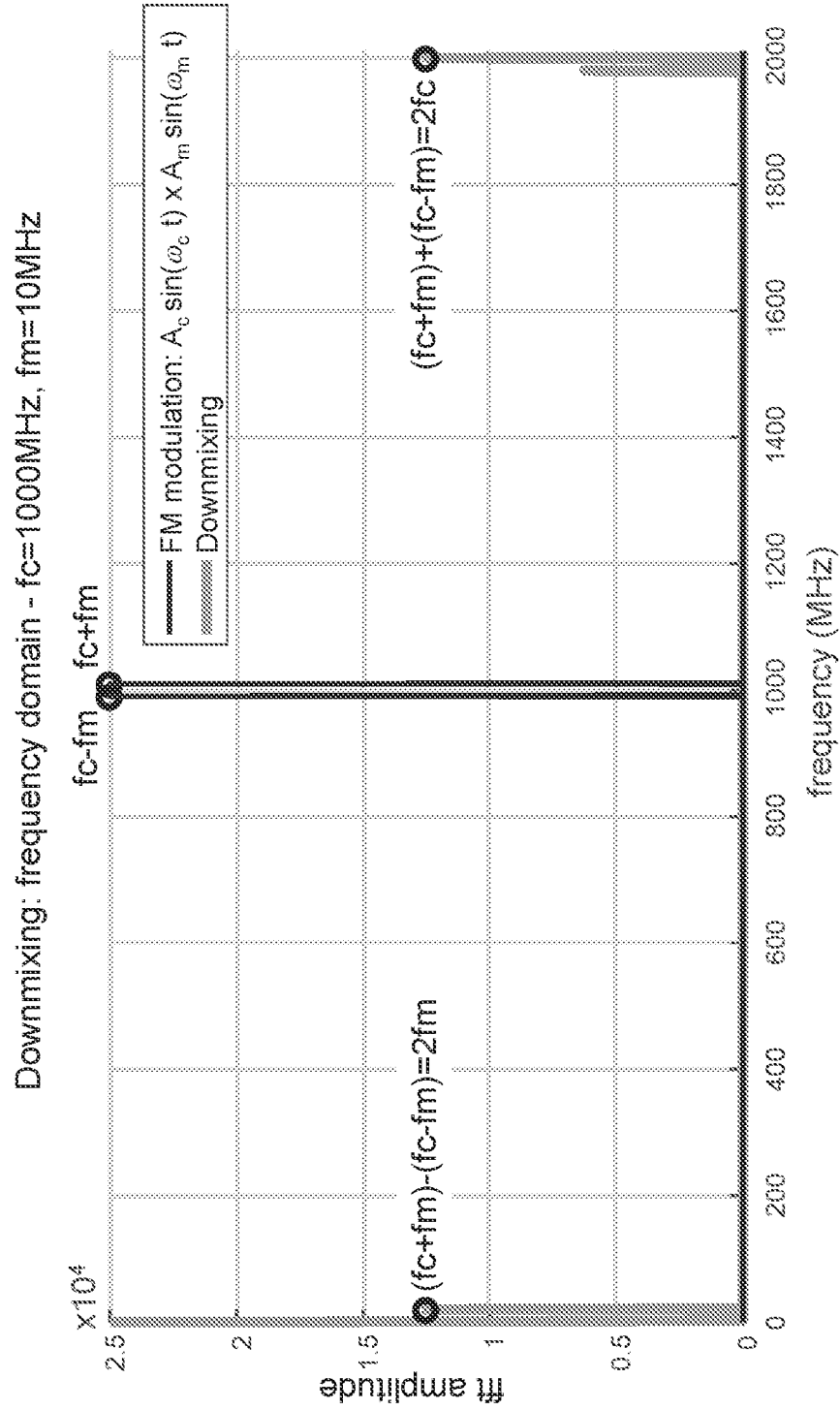

FIG. 8 shows a two-frequency downmixing. The downmixed signal in the time domain is shown in FIG. 8A. The downmixed signal may be obtained as a result of the quadratic mixing due to the sample-tip interaction, after performing a two frequency mixing step for providing the drive signal. The cantilever can pick up relevant information regarding the subsurface characterization of the sample from the down-mixed signal resulting from the tip sample interaction of the cantilever. The relatively low frequency of the envelope 60 (MHz range) of the downmixed signal can be determined by means of the cantilever tip. The downmixed signal is obtained with a second order assumption (quadratic mixer). FIG. 8B shows the downmixed signal in the frequency domain. Different frequency components are obtained, namely a DC component, a 2$f$(m) component (MHz), and other higher frequency components (GHz), e.g. 2$f$(c). The 2$f$(m) component can be easily recorded by means of the cantilever tip (MHz) using mechanical vibrations. The higher frequency components (e.g. in GHz) may be easily filtered out using a filter.

Figure 9:
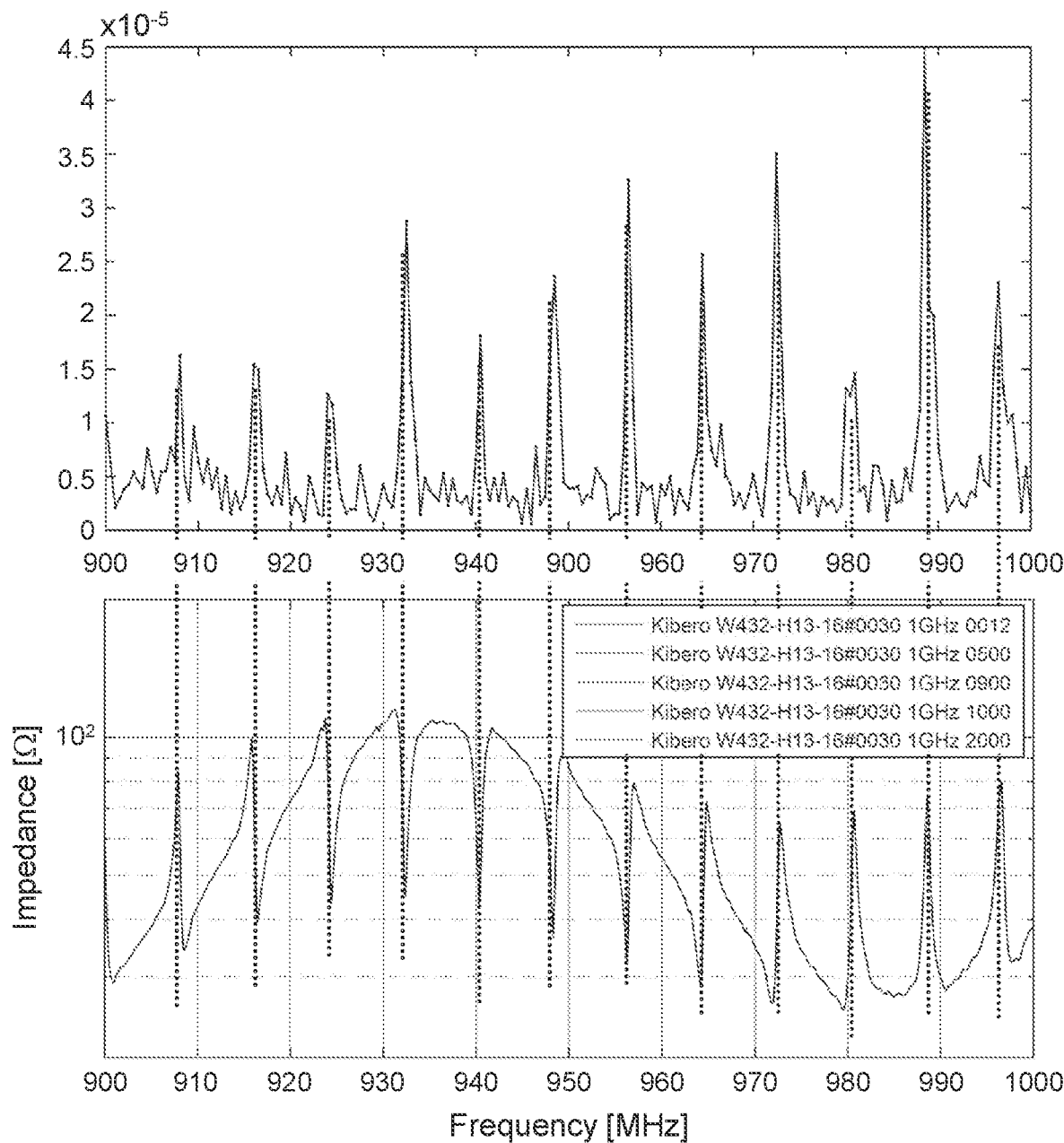
FIG. 9 shows frequency response measurements.

FIG. 9 shows frequency response measurements. In the top graph the sample surface displacement versus the frequency as measured by an AFM is illustrated. In the bottom graph the electrical impedance, determined using the electrical measurement device, in function of the frequency is illustrated. The resonance peaks are strongly correlated.

In some embodiments, the results are obtained using interleaved actuation and sensing by means of a piezoelectric transducer. The measurement device is configured to perform impedance measurements of the piezoelectric transducer. The resonance peaks are correlated with respect to each other in both graphs.

The out-of-plane sample surface displacement as a function of frequency in the upper graph may be obtained by performing a frequency sweep measurement. The out-of-plane sample surface may oscillate at the modulation frequency. The bottom figures shows the magnitude of impedance (absolute value) as a function of frequency.

The peaks detected in the impedance plot correspond to the peaks in the out-of-plane surface displacement which are downmixed to MHz frequencies by the tip-sample interaction during the subsurface AFM measurements. The sharp transitions in the impedance plot correspond to mechanical resonances. The slow trend is an effect of the electrical connections. At higher frequencies (e.g. GHz), electrical connections such as electrical cables may act as electric waveguides result in such a smooth and slow trend. Additionally or alternatively, other electrical quantities are measured using the measuring device. For instance, instead of the magnitude of the impedance, also a phase of the impedance may be used. It may also be possible to use the voltage and/or current generated by the electro-magnetic transducer operating in sensing mode.

Figure 10:
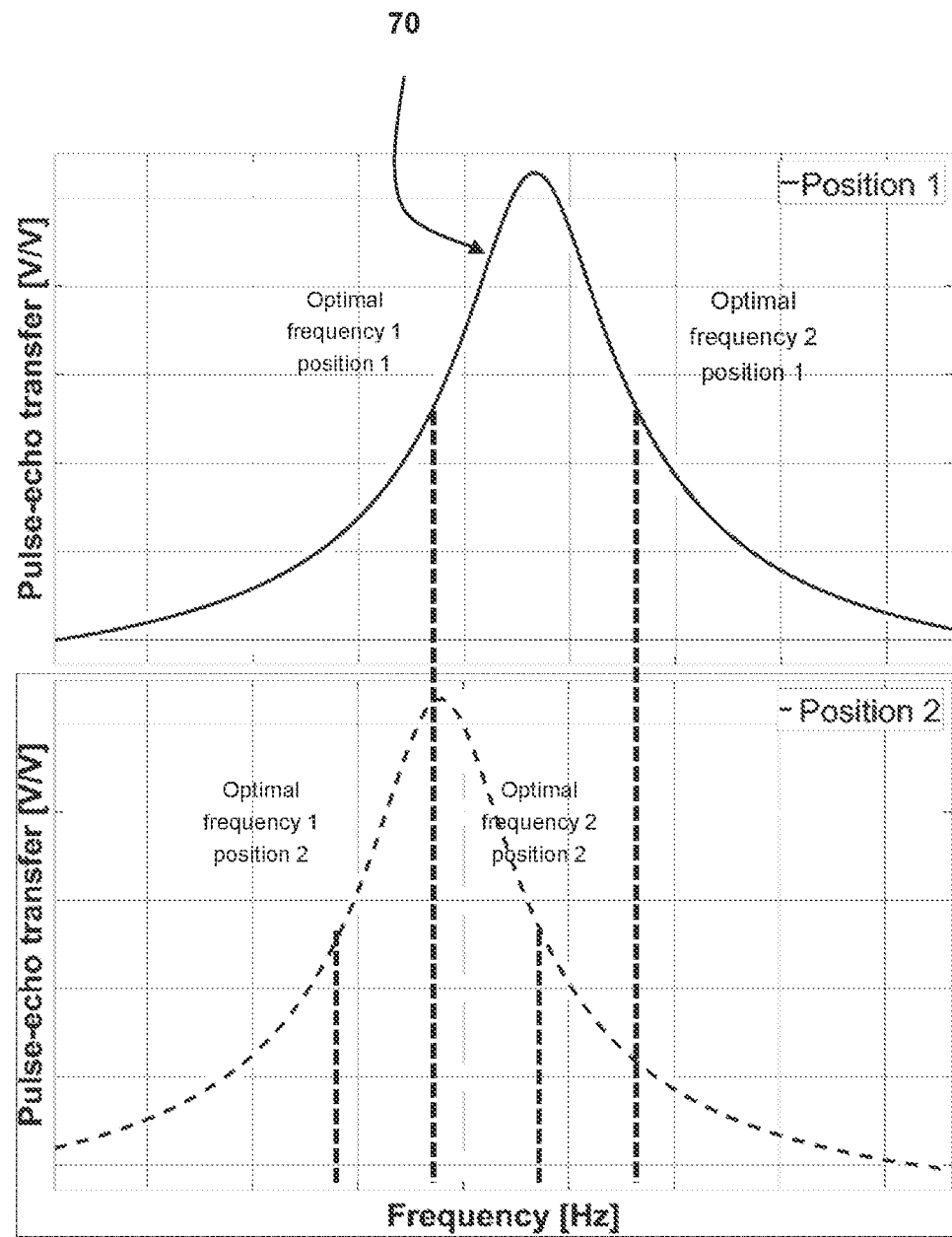
FIG. 10 shows peak tracking using the transfer function.

FIG. 10 shows peak tracking using the transfer function. Passive readout techniques may be employed. An drive signal may be provided to the electro-magnetic transducer (actuation). A resulting generated signal coming back from the electro-magnetic transducer can be measured using the measuring device (sensing). The input signal (actuation) and output signal (sensing) can be used for determining a (pulse-echo) transfer function (Volt/Volt). By use of the pulse echo transfer function, it may not be required to make an entire scan in the frequency domain in order to track the resonant frequencies. Graph 70 is the pulse echo transfer function.

The stack is not excited over the entire frequency range, but only at a limited number of frequencies, such as for example two frequencies (e.g. including the carrier frequency and the modulation frequency). The two frequencies in the drive signal may be downmixed as a result of the tip-sample interaction acting as a quadratic mixer. Advantageously, the two frequencies can be chosen in such a way that a useful carrier frequency f(c) and modulation frequency f(m) are obtained. If the original response, i.e. original pulse-echo transfer function, is known, a subsequent change of the ratio of the amplitude between two measured signals at frequencies f(c)−f(m) and f(c)+f(m) can indicate the shift of the resonance peak. Hence, in this way, it is possible to estimate the value of the shifted resonance peak such that the carrier frequency f(c) can be appropriately adjusted. The resonance peak can thus be easily tracked without requiring a frequency sweep over a large frequency range. The shift of the pulse echo transfer function (by, for example, temperature variations, changing clamping or coupling, changing optional coupling medium thickness, etc.) may be slow. The signal that is already being made for enabling the subsurface AFM measurements (cf. actuation) can be used for estimating, based on the ratio of the amplitudes at the actuation frequencies, whether the resonance peak has shifted in frequency.

In an example, f(c)−f(m) and f(c)+f(m) are measured, wherein the carrier frequency f(c) is chosen exactly in between for obtaining optimal sample surface displacements. If in the returning measurement signal, the measured amplitudes at f(c)−f(m) and f(c)+f(m) are different (ratio different than one), the carrier frequency f(c) is adjusted in order to obtain a new f(c)−f(m) and f(c)+f(m) which would result in a same measured amplitude in the returning measurement signal. Since, the shifts are rather gradual and slow, the resonance peak can be easily followed during the successive subsurface AFM measurements. The shift of the resonance peak can be determined and appropriate adjustment, e.g. of the carrier frequency f(c), can be carried out to provide actuation at or near the identified resonance peak. Initially, a calibration may be performed, wherein subsequently corrections/adjustments are performed during the subsurface AF measurements.

Advantageously, the drive signal used for performing the subsurface AFM measurements is used for tracking the resonance peak. Interference between actuation and sensing may thus be avoided.

Figure 11A:
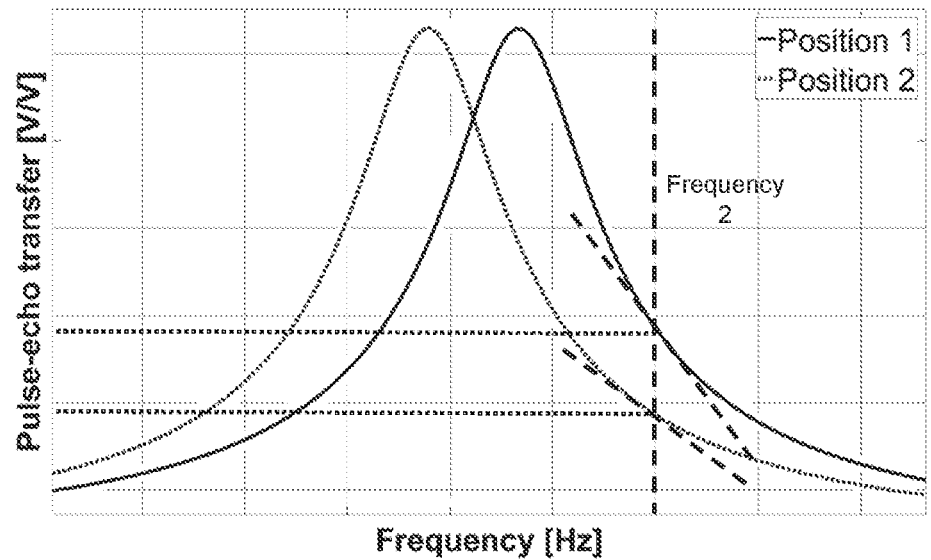
FIG. 11 shows peak tracking using the transfer function.

FIG. 11 shows peak tracking using the transfer function. Measurements may be performed at one frequency while tracking the amplitude over time. A plurality of measurements may be taken into account. Additionally or alternatively an amplitude tracking can be performed and the derivative of the amplitude over time can be determined, after which it is determined to which side compensation has to be made in order to track the resonance peak, see FIG. 11A. In this way, advantageously, only one frequency may be monitored for tracking the resonance peak.

Figure 11B:
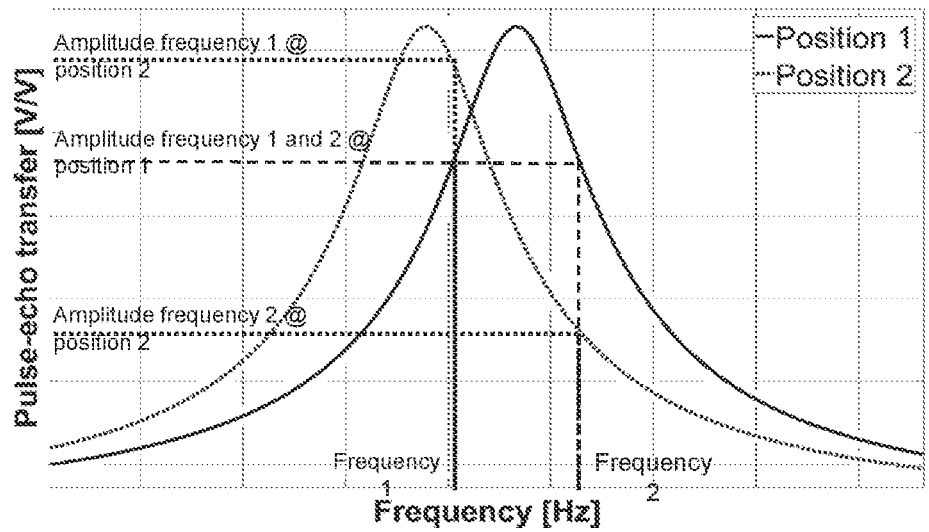

From a change of the ratio between amplitudes of a first frequency and a second frequency it can be determined whether the frequency of the peak is shifted to a higher frequency or a lower frequency, see FIG. 11B. Since the first frequency and second frequency are already being used for excitation of the stack, resonance frequency tracking can be performed using the signal that is already employed for carrying out the subsurface AFM measurements.

Figure 12:
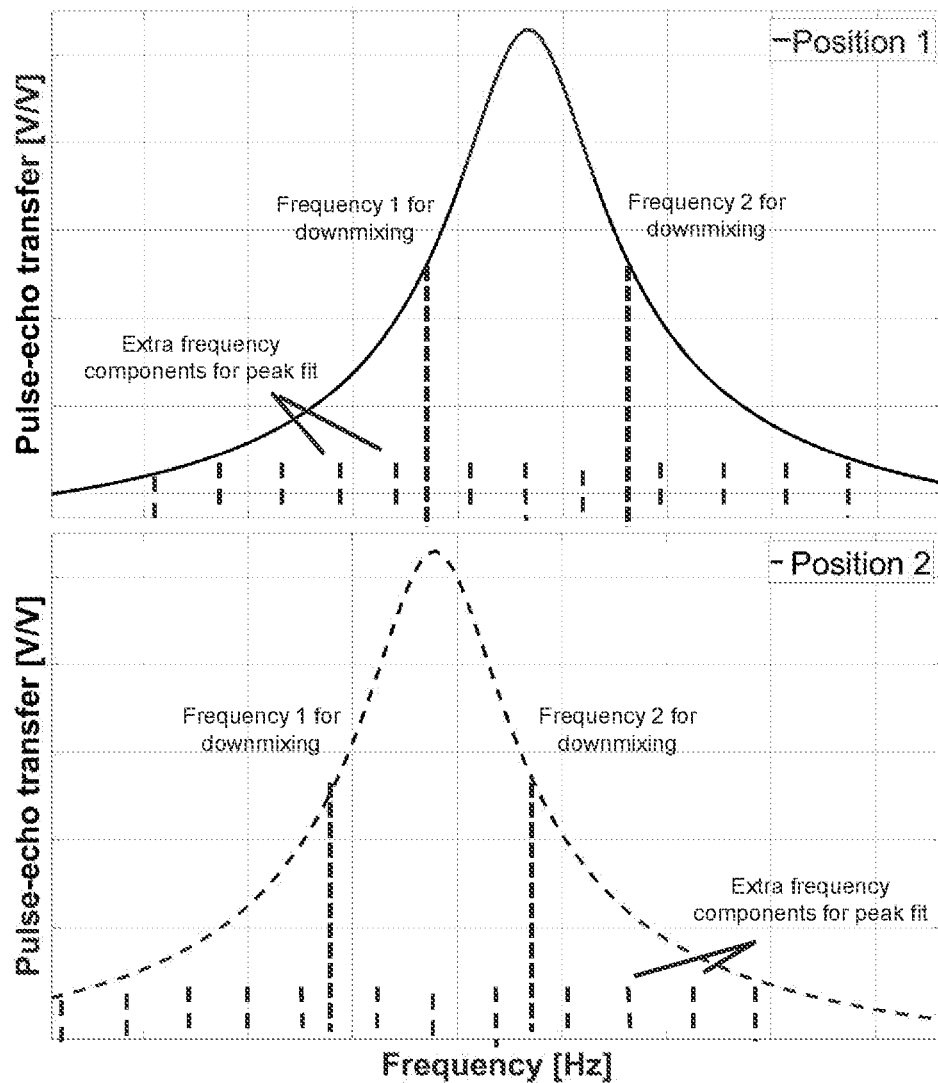
FIG. 12 shows peak tracking using the transfer function.

FIG. 12 shows active peak tracking using the transfer function. Since here is a quadratic relationship with downmixing, the electric drive signal produces, in addition to f(c)−f(m) and f(c)+f(m), a series of extra frequency components, but with typically relatively low amplitudes. By determining the shape of the extra frequency components by means of the measurement device (e.g. oscilloscope), the resonance frequency can be derived, such that that a shift of the resonance peak can be determined. Interference with the subsurface AFM measurements can be limited as a result of the extra frequency components having typically very small amplitudes as a result of the quadratic downmixing. The amplitudes of the extra frequency components may thus be chosen such that they are usable for pulse-echo measurements, but that the downmixed frequency amplitudes are negligible compared to desired downmixed components for subsurface AFM.

Additionally or alternatively, the frequency difference of the extra frequency components are chosen such that after downmixing overlap is substantially prevented with downmixed components of frequencies needed for subsurface AFM. If the frequency gap between the extra peaks is chosen to be different than f(m), then f(m) only comes with the signal intended for downmixing, so that interference of the extra peaks with the subsurface AFM measurements can be avoided.

Some embodiments may be implemented, for example, using a machine or tangible computer-readable medium or article which may store an instruction or a set of instructions that, if executed by a machine, may cause the machine to perform a method and/or operations in accordance with the embodiments.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. An atomic force microscopy system for performing subsurface atomic force microscopy measurements, the system comprising:
   a signal source for generating a drive signal;
   a transducer configured to receive the drive signal for converting the drive signal into vibrational waves and coupling the vibrational waves into a stack comprising a sample, for interaction with subsurface features within the sample;
   a cantilever tip for contacting the sample for measuring surface displacement resulting from the vibrational waves to determine the subsurface features; and
   a measurement device for measuring a measurement signal returning from the transducer, wherein the measuring occurs during and/or in between the cantilever tip measuring the surface displacement.

2. The atomic force microscopy system according to claim 1, wherein the system includes a controller configured to adjust the drive signal based on the measurement signal.

3. The atomic force microscopy system according to claim 2, wherein the controller is configured to determine at least one resonance peak of the stack based on the measurement signal.

4. The atomic force microscopy system according to claim 2, wherein the controller is configured to determine a change of at least one resonance frequency of the stack during the subsurface atomic force microscopy measurements.

5. The atomic force microscopy system according to claim 4, wherein the controller is configured to adjust a frequency in the drive signal based on the change of the at least one resonance frequency of the stack for tracking and/or following the at least one resonance frequency of the stack.

6. The atomic force microscopy system according to claim 2,
wherein the drive signal includes at least:
a difference frequency component at a difference of a carrier frequency and a modulation frequency, and
a sum frequency component at a sum of the carrier frequency and the modulation frequency;
wherein the cantilever is configured to resonate at a contact modulation frequency during the subsurface atomic force microscopy measurements, and
wherein the controller is configured to adjust the carrier frequency of the drive signal based on the measurement signal.

7. The atomic force microscopy system according to claim 6, wherein the controller is configured to adjust the carrier frequency based on a change of the at least one resonance frequency to track and/or follow the at least one resonance frequency,
wherein the carrier frequency is maintained at the at least one resonance frequency being tracked and/or followed such that the difference frequency component and the sum frequency component are located on opposite sides of the carrier frequency.

8. The atomic force microscopy system according to claim 2, wherein the controller is configured to track and/or follow the at least one resonance frequency using at least one of the group consisting of:
a ratio of frequency response amplitudes of two different frequency components;
a frequency response amplitude of at least one frequency component; and
a time-derivative of a frequency response amplitude of at least one frequency component.

9. The atomic force microscopy system according to claim 2, wherein a layer of a coupling medium is provided between the transducer and the sample in the stack,
wherein the controller is configured to determine a measure of the thickness of the layer of coupling medium based on a change of the at least one resonance frequency of the stack during atomic force microscopy measurements, and
wherein the controller is configured to control a supply of coupling medium to maintain a substantially constant thickness of the layer of coupling medium.

10. The atomic force microscopy system according to claim 1, wherein the system includes a circulator, wherein:
a first port of the circulator is connected to the transducer,
a second port of the circulator is connected to the measurement device, and
a third port of the circulator is connected to the signal source.

11. The atomic force microscopy system according to claim 1, wherein the signal source is configured to perform a multi-frequency excitation including a plurality of frequency components,
wherein the drive signal includes a first set of frequency components for performing the subsurface atomic force microscopy measurements, and
wherein the measurement device is configured to measure a frequency response at at least one of the frequency components of the first set of frequency components.

12. The atomic force microscopy system according to claim 11, wherein the drive signal includes a second set of frequency components including one or more frequency components,
wherein the one or more frequency components differ from the frequency components of the first set, and
wherein the measurement device is configured to additionally measure a frequency response at at least the frequencies of the second set of frequency components.

13. The atomic force microscopy system according to claim 12, wherein:
the second set of frequency components have a different frequency than the modulation frequency or an integer number of times the modulation frequency, and/or
amplitudes of the second set of frequency components are smaller than amplitudes of the first set of frequency components.

14. The atomic force microscopy system according to claim 1, wherein the transducer is an electro-mechanical transducer, the electro-mechanical transducer being configured to receive an electrical drive signal for converting the electrical drive signal in the vibrational waves being coupled into the stack, and
wherein the measurement device is an electrical measurement device for measuring an electrical measurement signal returning from the transducer.

15. A method for performing subsurface atomic force microscopy measurements, the method including:
providing a signal source for generating an drive signal;
providing an transducer configured to receive the drive signal for converting the drive signal into vibrational waves and coupling the vibrational waves into a stack comprising a sample for interaction with subsurface features within the sample;
providing a cantilever tip for contacting the sample for measuring surface displacement resulting from the vibrational waves to determine subsurface features; and
measuring, by a measurement device, a measurement signal returning from the transducer, wherein the measuring occurs during and/or in between the cantilever tip measuring the surface displacement.

* * * * *